(12) United States Patent
McGrath et al.

(10) Patent No.: US 12,513,798 B2
(45) Date of Patent: Dec. 30, 2025

(54) SYSTEMS AND METHODS FOR TUNABLE LED LIGHTING

(71) Applicant: LEDdynamics, Inc., Randolph, VT (US)

(72) Inventors: William R. McGrath, Randolph, VT (US); Zachary Blanchard, Bellows Falls, VT (US); Oliver Piluski, Randolph, VT (US); Jason Orzell, Randolph, VT (US); Neil P. Cannon, Eldorado Springs, CO (US)

(73) Assignee: 3LED Inc., Woburn, MA (US)

( * ) Notice: Subject to any disclaimer, the term of this patent is extended or adjusted under 35 U.S.C. 154(b) by 156 days.

(21) Appl. No.: 18/208,528

(22) Filed: Jun. 12, 2023

(65) Prior Publication Data

US 2023/0328855 A1    Oct. 12, 2023

Related U.S. Application Data

(63) Continuation-in-part of application No. 17/826,431, filed on May 27, 2022, now Pat. No. 11,716,796, which is a continuation of application No. 17/143,775, filed on Jan. 7, 2021, now Pat. No. 11,490,479.

(60) Provisional application No. 62/958,978, filed on Jan. 9, 2020.

(51) Int. Cl.
  *H05B 45/20*    (2020.01)
  *H05B 45/46*    (2020.01)
(52) U.S. Cl.
  CPC ............. *H05B 45/20* (2020.01); *H05B 45/46* (2020.01)

(58) Field of Classification Search
  CPC ......... H05B 45/20; H05B 45/46; H05B 47/16
  USPC ......................................................... 315/294
  See application file for complete search history.

(56) References Cited

U.S. PATENT DOCUMENTS

| | | |
|---|---|---|
| 8,021,021 B2 | 9/2011 | Paolini |
| 9,788,387 B2 | 10/2017 | Soler et al. |
| 9,795,000 B1 | 10/2017 | Sooch et al. |
| 9,807,845 B2 | 10/2017 | Clark et al. |
| 9,844,116 B2 | 12/2017 | Soler et al. |
| 9,900,957 B2 | 2/2018 | van de Ven et al. |
| 9,920,913 B2 | 3/2018 | Heyderman |
| 10,321,536 B2 | 6/2019 | Hamilton et al. |
| 10,327,298 B1 | 6/2019 | Hsia |
| 10,420,184 B1 | 9/2019 | Soler et al. |

(Continued)

FOREIGN PATENT DOCUMENTS

| | | |
|---|---|---|
| DE | 202016007323 | 3/2018 |
| WO | WO2013090945 | 6/2013 |
| WO | WO2019139636 | 7/2019 |

OTHER PUBLICATIONS

Search Report Response in European Patent Application No. 21150796.7.

(Continued)

*Primary Examiner* — Ryan Jager

(57) ABSTRACT

A tunable lighting system includes a first LED having a first spectral output, a second LED having a second spectral output, and a correction circuit including a correction LED. The correction circuit in the tunable lighting system controls the correction LED to emit light that, when combined with light output from the first LED and light output from the second LED, produces a selected spectral characteristic.

11 Claims, 20 Drawing Sheets

(56) References Cited

U.S. PATENT DOCUMENTS

| | | | |
|---|---|---|---|
| 10,499,480 B2 | 12/2019 | Yadav et al. | |
| 10,582,596 B2 | 3/2020 | Sooch et al. | |
| 10,595,376 B2 * | 3/2020 | Soler | A61M 21/02 |
| 11,490,479 B2 * | 11/2022 | McGrath | H05B 45/46 |
| 11,716,796 B2 * | 8/2023 | McGrath | H05B 45/24 315/294 |
| 2007/0064421 A1 | 3/2007 | Baba | |
| 2012/0300447 A1 | 11/2012 | Maxik et al. | |
| 2014/0035472 A1 * | 2/2014 | Raj | H05B 45/22 315/297 |
| 2014/0300274 A1 * | 10/2014 | Acatrinei | H05B 45/3578 315/122 |
| 2017/0086274 A1 * | 3/2017 | Soler | A61M 21/00 |
| 2019/0373700 A1 * | 12/2019 | Meir | F21V 9/30 |
| 2020/0059997 A1 * | 2/2020 | Dixon | H02J 7/0068 |
| 2020/0100333 A1 * | 3/2020 | Petluri | H10H 20/851 |
| 2020/0332969 A1 | 10/2020 | Soler et al. | |
| 2021/0219395 A1 * | 7/2021 | McGrath | H05B 45/24 |
| 2022/0295612 A1 * | 9/2022 | McGrath | H05B 45/24 |

OTHER PUBLICATIONS

Search Report in European Patent Application No. 21150796.7.
EP Application No. 21150796.7 Communication pursuant to Article 94(3) EPC, Jan. 30, 2023.

* cited by examiner

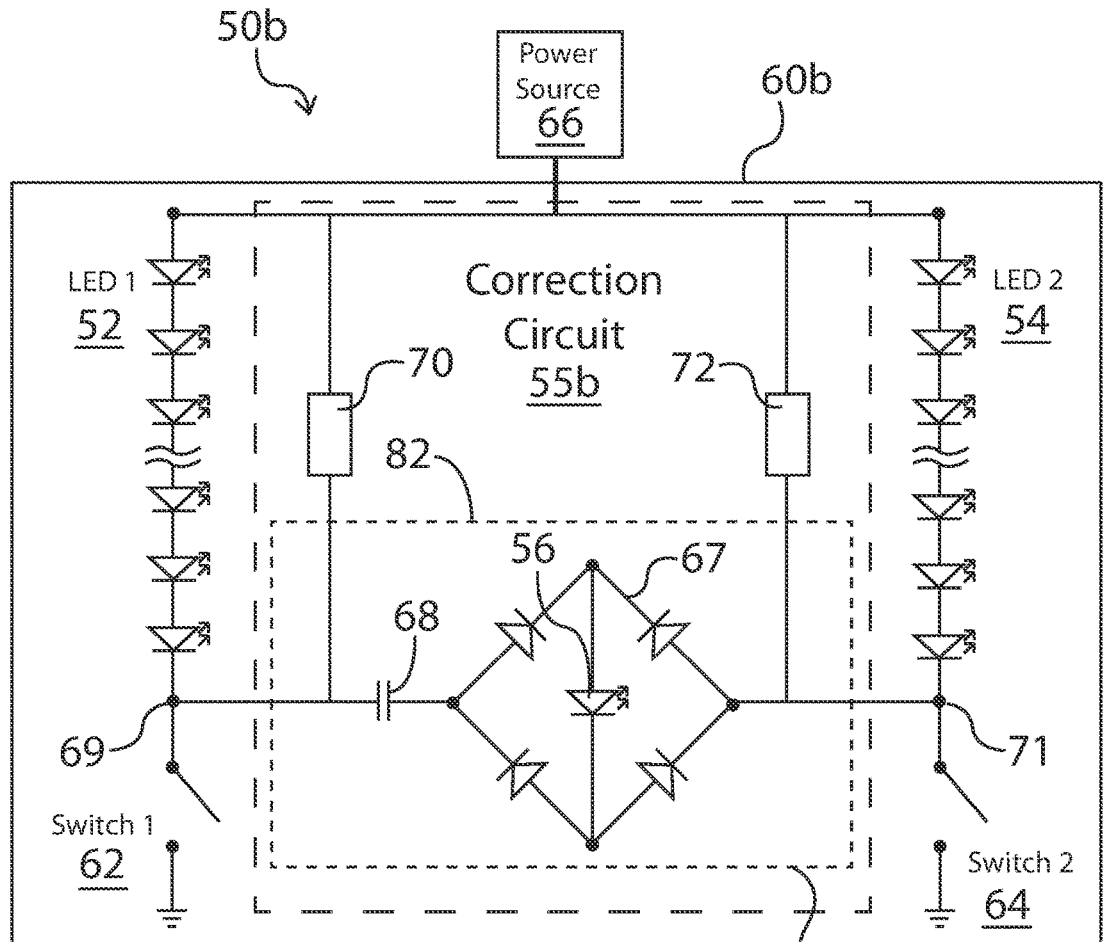
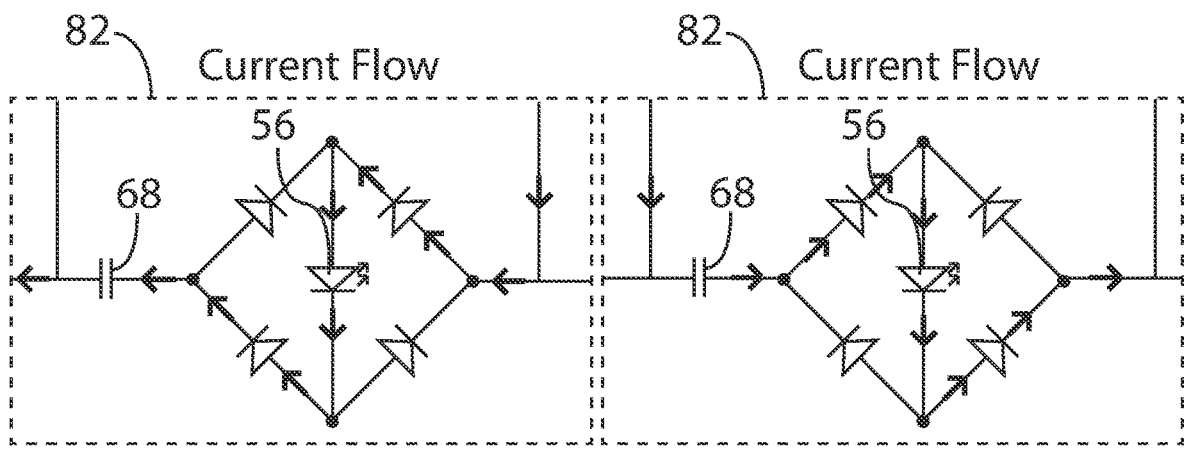
Figure 9a
Figure 9b  Figure 9c

| | Measurements without Correction | | | | | |
|---|---|---|---|---|---|---|
| Target CCT(K) | 2700 | 3000 | 3500 | 4000 | 5000 | 6000 |
| Chromaticity CIE 1931 x | 0.4597 | 0.4337 | 0.4008 | 0.3777 | 0.3442 | 0.322 |
| Chromaticity CIE 1931 y | 0.4117 | 0.3975 | 0.3788 | 0.3658 | 0.3469 | 0.3343 |
| Chromaticity CIE 1976 u' | 0.2619 | 0.2514 | 0.2377 | 0.2277 | 0.2126 | 0.2023 |
| Chromaticity CIE 1976 v' | 0.5277 | 0.5183 | 0.5055 | 0.4963 | 0.4822 | 0.4725 |
| Delta u'v' (uncorrected) | 0.0004 | -0.0022 | -0.0043 | -0.0044 | -0.002 | 0.0014 |
| CCT | 2711 | 3000 | 3502 | 3993 | 5021 | 5995 |
| CRI Average (RA) | 98 | 98 | 97 | 97 | 97 | 98 |
| CQS | 97 | 97 | 98 | 98 | 98 | 99 |

| | Measurements with Correction | | | | | |
|---|---|---|---|---|---|---|
| Target CCT(K) | 2700 | 3000 | 3500 | 4000 | 5000 | 6000 |
| Chromaticity CIE 1931 x | 0.46 | 0.4374 | 0.4059 | 0.3083 | 0.3445 | 0.3221 |
| Chromaticity CIE 1931 y | 0.4117 | 0.4051 | 0.3914 | 0.3773 | 0.3512 | 0.3342 |
| Chromaticity CIE 1976 u' | 0.2621 | 0.2505 | 0.2358 | 0.2248 | 0.2112 | 0.2024 |
| Chromaticity CIE 1976 v' | 0.5278 | 0.5219 | 0.5116 | 0.5018 | 0.4844 | 0.4725 |
| Delta u'v' (corrected) | 0.0004 | 0.0004 | 0.0002 | 0.0003 | 0 | 0.0013 |
| CCT (K) | 2708 | 3000 | 3493 | 4004 | 5022 | 5993 |
| CRI Average (RA) | 98 | 98 | 98 | 98 | 97 | 98 |
| CQS | 97 | 97 | 98 | 98 | 98 | 99 |

Figure 16

SYSTEMS AND METHODS FOR TUNABLE LED LIGHTING

CROSS-REFERENCES

This application is a continuation-in-part of U.S. patent application Ser. No. 17/826,431, filed May 27, 2022 and titled, "Systems and Methods for Tunable LED Lighting" by the present inventors, which was a continuation of U.S. patent application Ser. No. 17/143,775 filed Jan. 7, 2021, now issued U.S. Pat. No. 11,490,479, and titled, "Systems and Methods for Tunable LED Lighting" by the present inventors, which claimed priority of U.S. provisional application Ser. No. 62/958,978 filed Jan. 9, 2020 and titled "Use of Correlated Color Temperature Correction and Circadian Rhythm Matching for Generating More Accurate and Natural LED Light" by the present inventors.

BACKGROUND

The human body has evolved to sense and relate to the light produced by the sun, and the human eye is sensitive to deviations from the sun's light. Colors of objects are perceived differently under light having different qualities. Further, light sensed by the human eye affects both the mind and body. Exposing humans to various wavelengths and intensities of light have been shown to affect circadian rhythms.

FIGS. 1 and 2 show diagrams that were developed by the International Commission on Illumination (C.I.E.). These diagrams illustrate how the sun's light can be approximated by the black body locus emissions. The diagrams are shown in gray scale. It should be understood that typically the diagrams are shown in color, however, gray tones are sufficient for the present explanation.

FIG. 1 is the C.I.E. 1931 color chromaticity diagram. The human eye has three types of color sensors (i.e., cone cells) that respond to different ranges of wavelengths. A full plot of all visible colors is a three-dimensional figure. The concept of color, however, can be divided into two parts: brightness and chromaticity. Chromaticity is the quality of a color independent of luminance. For example, the color white is a bright color, while the color grey is considered to be a less bright version of that same white. In other words, the chromaticity of white and grey are the same while their brightness differs. In FIG. 1, the x-parameter is a mix of cone response curves and the y-parameter is a measure of the luminance of a color. Chromaticity may then be specified by the two derived parameters x and y, i.e., two of the three normalized values being functions of all three tristimulus values X, Y, and Z. The tristimulus values are the parameters corresponding to levels of stimulus of the three kinds of cone cells found in the human eye. The filled region in the diagram in FIG. 1 represents all of the chromaticities visible to the average person and is called the "gamut" of human vision. The curved edge of the gamut is called the spectral locus and corresponds to monochromatic light (each point representing a pure hue of a single wavelength), with wavelengths listed in nanometers. The straight edge on the lower part of the gamut is called the line of purples. These colors, although they are on the border of the gamut, have no counterpart in monochromatic light. Less saturated colors appear in the interior of the figure with white at the center.

FIG. 2 is the C.I.E. 1976 color chromaticity diagram. In FIG. 2, u' and v' are transformations of x and y from FIG. 1 and provide better perceptual uniformity of colors for the human eye. This locus is a combination of red, blue and green light. Sunlight, which is a combination of these, changes intensity, hue and angle throughout the day. Accordingly, it is difficult for an artificial light source to replicate sunlight.

Because LEDs produce light with high output efficiency and long product lifetime, LED lighting is becoming the modern choice generally replacing older types of lighting. The light from LEDs is not of a broad spectrum and does not correlate well with the natural emissions of a black body such as the sun. LED light is generated by electrons dropping from one energy state to another within a semiconductor. Accordingly, LEDs produce only light of discrete wavelengths. The human eye perceives that it is seeing a certain color, for example, white light, from a combination of discrete colors. Conventional white LEDs, however, typically do not produce a full spectrum, as an incandescent light bulb, a blackbody emitter, does.

FIG. 3 is a portion of the chromaticity diagram of FIG. 2. The line labeled "spectrum locus" is an edge of the gamut shown in FIG. 2. The area above the spectrum locus is light outside the range visible to an average human. The area below the spectrum is within the gamut and so is light within the range visible to an average human. The "blackbody locus" is a curve showing the color of an incandescent black body as the temperature of the black body changes. As described above, a commonly referenced blackbody is the sun. Light along the blackbody curve is perceived as being "white". The lines intersecting the blackbody locus are lines for correlated color temperature (CCT) lines for various colors. CCT is a measure of a light source's color appearance defined by the proximity of the light source's chromaticity coordinates to the blackbody locus. If a light source were to output an ideal full spectrum "white" light, the light output curve would follow the blackbody locus at every CCT within the relevant range.

To offer systems able to be tuned to points within a range of white light along the blackbody locus, some conventional lighting systems have provided two sources with different color temperatures. Example outputs of these conventional lighting systems are shown in FIGS. 4 and 5. FIGS. 4 and 5 show the same chromaticity diagram as FIG. 3 with the addition of a line showing the light output of two different conventional lighting systems. The conventional lighting systems are tuned between the two light sources. In FIG. 4, a first LED has light output, also referred to as "spectral output", located at the point where the 2700 CCT line intersects the blackbody locus and a second LED has light output, or spectral output, at the point where the 6500 CCT line intersects the blackbody locus. The LEDs individually emit light that is desirable, that is, light that falls on the blackbody curve. The combination of the outputs of the first LED and the second LED is the straight line connecting the two blackbody intersects. Accordingly, it can be seen that, while the combination of various relative strengths of light from the two LEDs does achieve other CCTs, those CCTs do not fall on the blackbody locus. In FIG. 5, the first and second LEDs in the conventional lighting system individually emit light that does not fall on the blackbody locus. However, in combination, resulting light output intersects the blackbody locus at two points but typically does not follow the blackbody locus. Output that does not coincide with the black body locus is generally undesirable.

Circadian rhythm is a correlation between an organism's biological clock and sunlight. The circadian rhythm is important for sleep, alertness and other biological functions. Keeping human circadian rhythms synchronized within one's daily schedule is thought to be important for health and productivity. To keep circadian rhythms on track, humans are typically advised get the proper light signals, i.e., circadian light stimulus. Often, people who are most likely to have circadian rhythms out of synchronization are those who spend significant amounts of time indoors in dim light. Proper indoor exposure to the appropriate wavelengths, intensity and exposure time of light is believed to be part of keeping circadian rhythms on track.

Given what presently is available for LED light systems, there is significant opportunity for improvements. An objective of the present invention is therefore to provide LED light improvements that address correlated color temperature correction and circadian rhythm matching.

SUMMARY

The present invention is directed to systems and methods for generating accurate and natural LED light for color correlated temperature correction and circadian rhythm matching.

In one implementation, the present disclosure is directed to a tunable lighting system that outputs light having a selected spectral characteristic, for example, "white" light. The tunable lighting system includes a first LED, a second LED and a color correction circuit. The color correction circuit includes a correction LED that produces light that when combined with light from the first LED and light from the second LED the combined light produces a selected spectral characteristic.

In another implementation, the present disclosure is directed to a tunable lighting system that provides light to match a circadian rhythm for a given location on the surface of the earth. The system comprises an LED and a controlled power source to drive the LED to provide light that matches the circadian rhythm for the specified location.

In one embodiment, a tunable lighting system includes a first white LED having a first spectral output on a blackbody curve, a second white LED having a second spectral output on the blackbody curve, and a correction circuit. The correction circuit includes a correction LED configured to output light having a wavelength in green, cyan or yellow. The correction circuit controls the correction LED to emit light that, when combined with light emitted from the first LED and light emitted from the second LED, produces light that follows the blackbody curves. The benefits of this embodiment include the ability to provide a desired color of white light, accurate color rendering and also circadian-rhythm matching light.

In an alternative embodiment, the correction circuit of the tunable lighting system includes a capacitor; and two correction diodes connected in parallel and oppositely biased and where the capacitor is connected in series with the two correction diodes. This circuit applies current within the circuit to balance the outputs of the LEDs to maintain the selected spectral characteristic. In a first alternative arrangement, one of the two correction diodes is an LED. In a second alternative arrangement, both of the two corrections diodes are LEDs. In a third alternative arrangement, the correction circuit further includes a first charge restorative device and a second charge restorative device, wherein the first charge restorative device and second charge restorative device are selected to bias the correction circuit to favor the first LED having the first wavelength over the second LED having the second wavelength. This provides greater control over the tunable lighting system.

In another embodiment of the tunable lighting system, the correction circuit further a capacitor connected in series with a bridge rectifier where the bridge rectifier has a center diode and that center diodes is the correction LED.

In another embodiment of the tunable light system, the correction circuit includes a microprocessor to control the correction LED.

In a further alternative embodiment, the tunable lighting system further includes a third LED having a third spectral output, a fourth LED having a fourth spectral output, and a second correction circuit. The third LED, fourth LED and second correction circuit configured to enable the tunable lighting system to emit light having to a second spectral characteristic.

In a further alternative embodiment of the tunable lighting system, the first LED is a cool white LED, the second LED is a warm white LED and the correction LED is a green LED.

Another embodiment is a correction circuit for a tunable lighting system where the tunable lighting system having a first LED having a first spectral output, and a second LED having a second spectral output. The correction circuit includes a correction LED. The correction circuit controls the correction LED to emit light that, when combined with light output from the first LED and light output from the second LED, has a selected spectral characteristic.

In an alternative embodiment, the correction circuit includes a capacitor, and two correction diodes connected in parallel and oppositely biased and where the capacitor is connected in series with the two correction diodes. In a first alternative arrangement, a first correction diode of the two correction diodes is an LED. In a second alternative arrangement, both of the two correction diodes are LEDs.

In an alternative embodiment, the correction circuit includes a first charge restorative device and a second charge restorative device. The first charge restorative device and second charge restorative device are selected to bias the correction circuit to favor the first LED over the second LED.

In a further alternative embodiment, the correction circuit includes a capacitor connected in series with a bridge rectifier where the bridge rectifier has a center diode. The correction LED is the center diode.

In a still further alternative embodiment, the correction circuit includes a microprocessor to control the correction LED.

Another embodiment is a method of operating a tunable lighting system where the lighting system includes a first LED having a first spectral output on a blackbody curve, a second white LED having a second spectral output on the blackbody curve, and a correction circuit including a correction LED configured to output light having a wavelength in green, cyan or yellow. The method has the steps of generating signals in the correction circuit to control the correction LED to emit light that, when combined with light from the first LED and light from the second LED, produces light that follows the blackbody curve.

The present invention together with the above and other advantages may best be understood from the following detailed description of the embodiments of the invention illustrated in the drawings, wherein:

DRAWINGS

FIG. 9a is a diagram of an alternative embodiment of the tunable lighting system according to principles of the invention;

FIG. 9b is a diagram of a portion of the correction circuit of the tunable lighting system of FIG. 9a showing current flow;

FIG. 9c is a diagram of a portion of the correction circuit of the tunable lighting system of FIG. 9a showing current flow;

FIG. 16 is test data for the lighting system depicted in one embodiment of the invention;

FIG. 17b is a schematic of the backside of the tunable lighting system of FIG. 17a;

FIG. 18a is a sectional schematic diagram along line 18a-18a of FIG. 17a illustrating one embodiment of the fabrication structure for the tunable lighting system of FIG. 17a;

FIG. 18b is a sectional schematic diagram along line 18b-18b of FIG. 17a illustrating another embodiment of the fabrication structure for the tunable lighting system of FIG. 17a;

DESCRIPTION

Embodiments of the present invention are systems and methods for tunable lighting using LEDs. Some embodiments of the tunable lighting systems and methods generate accurate and natural LED light for color correlated temperature correction. Some embodiments of the tunable lighting systems and methods also provide circadian rhythm matching. These and other exemplary embodiments of a tunable lighting system 50 are illustrated in FIGS. 6-19.

Figure 1:
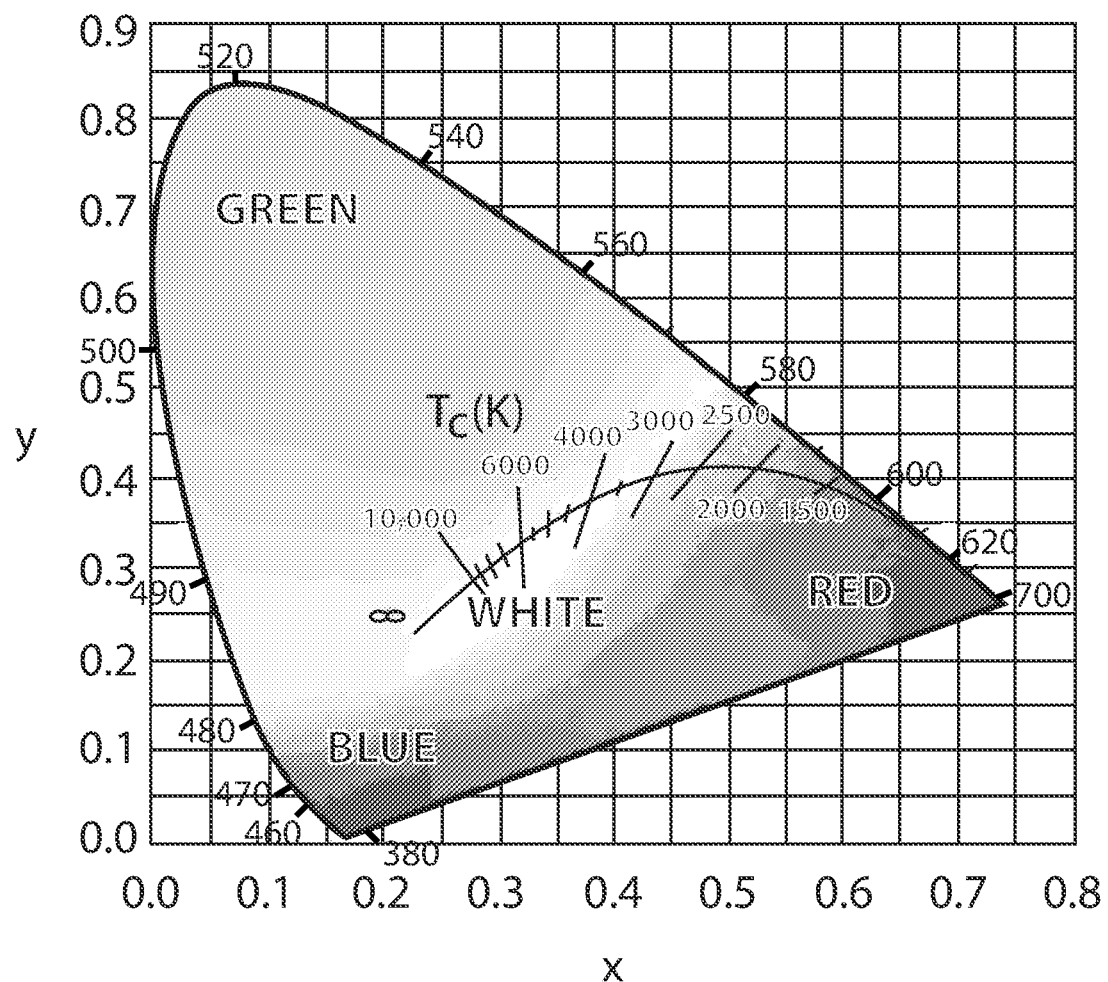
FIG. 1 is the International Commission on Illumination (C.I.E.) 1931 color space chromaticity diagram.
Figure 2:
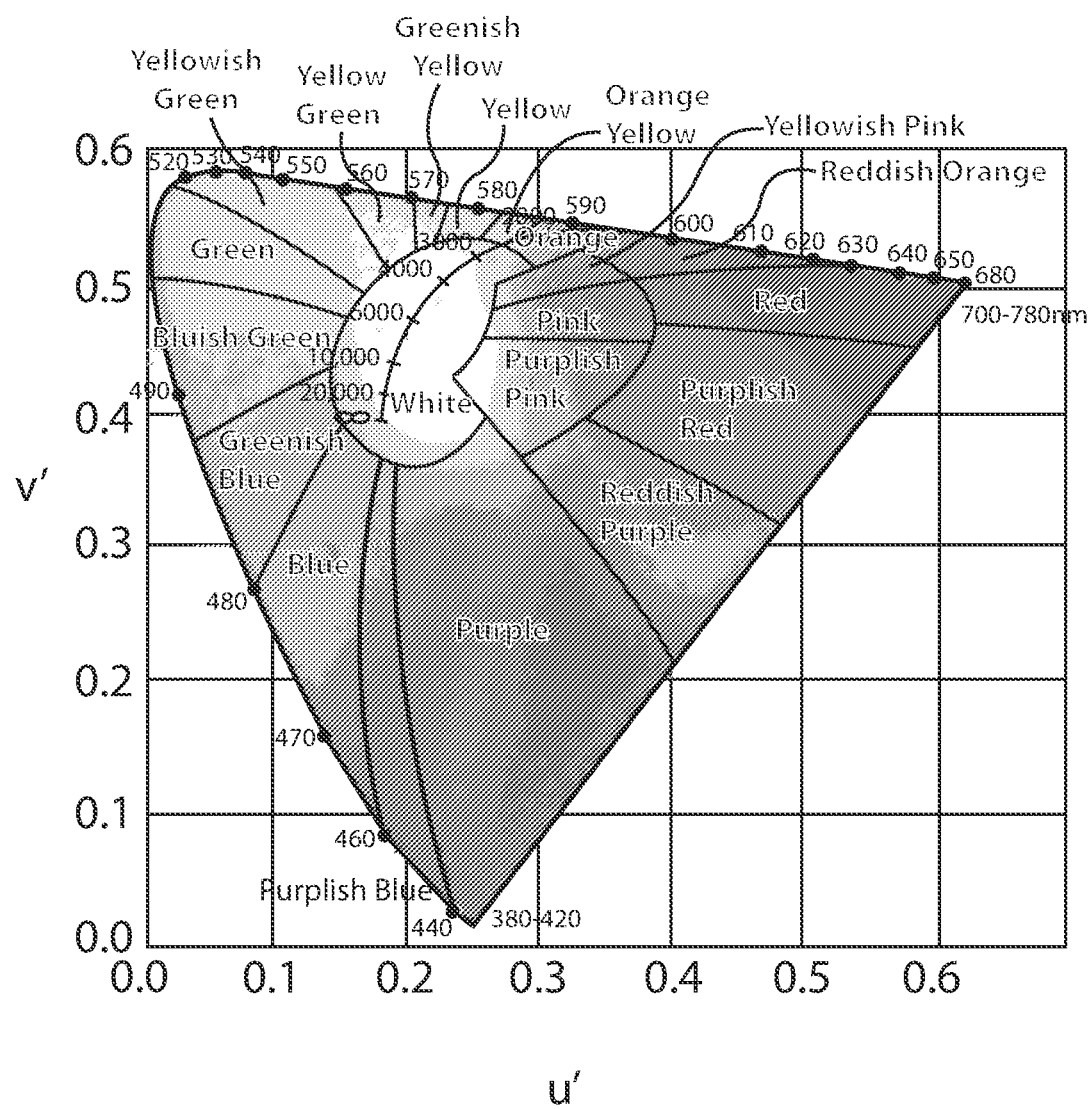
FIG. 2 is the C.I.E. 1976 color space chromaticity diagram.
Figure 3:
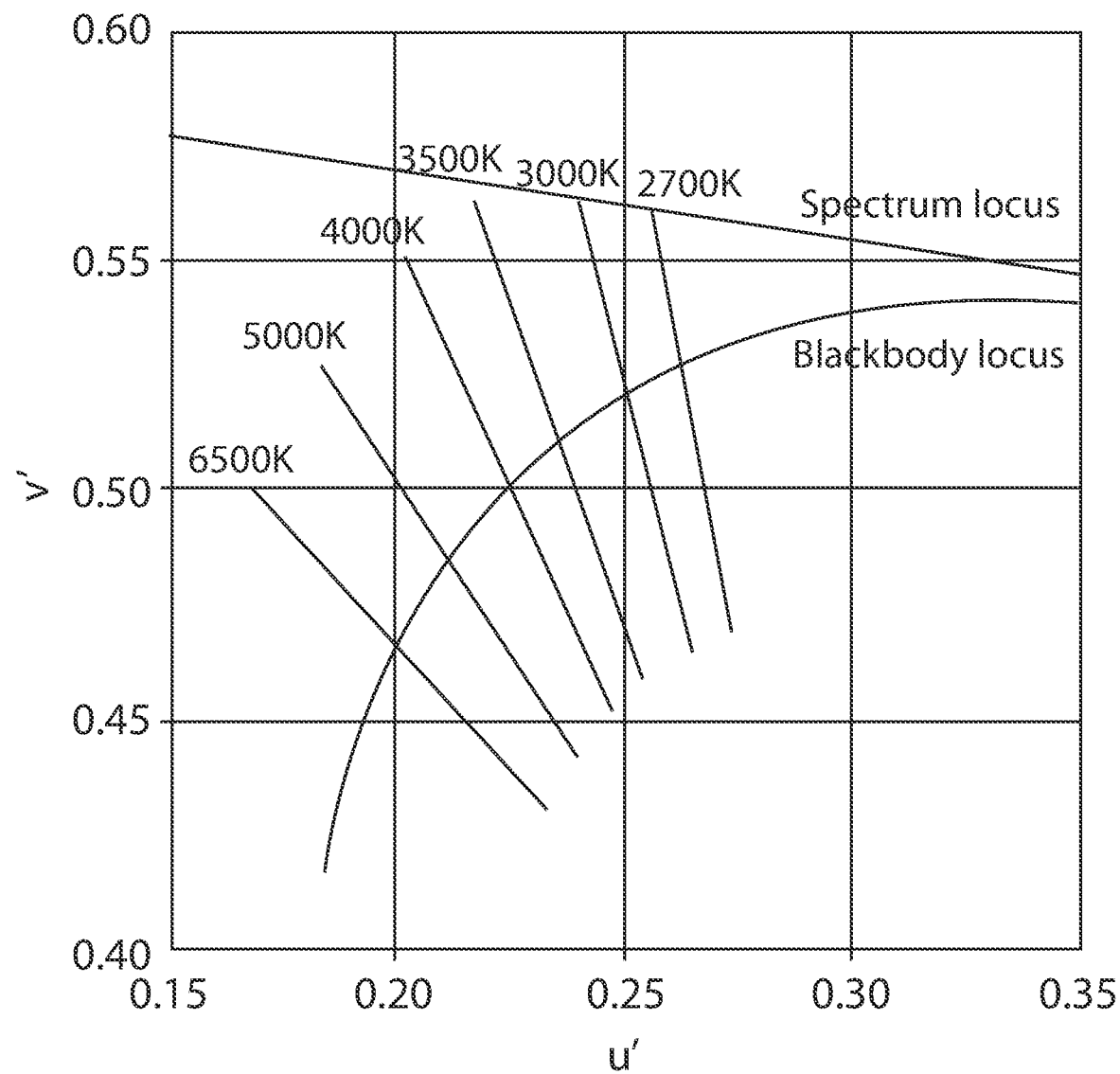
FIG. 3 is a portion of the chromaticity diagram of FIG. 2 showing the black body locus for light as a function of color temperature.
Figure 4:
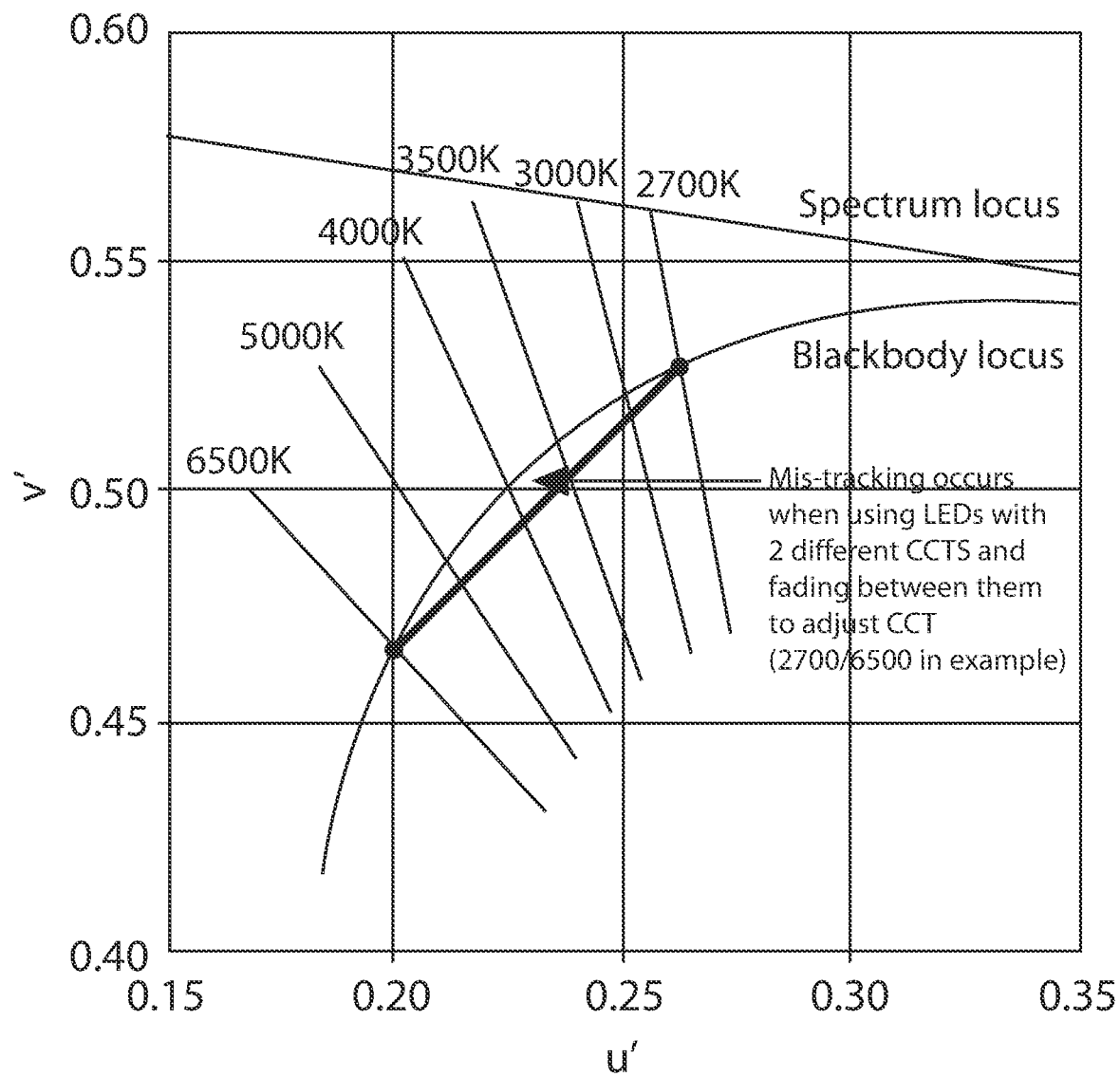
FIG. 4 is a chromaticity diagram illustrating a first example of light output from a conventional system having two LEDs against the blackbody locus of FIG. 3 and showing mistracking.
Figure 5:
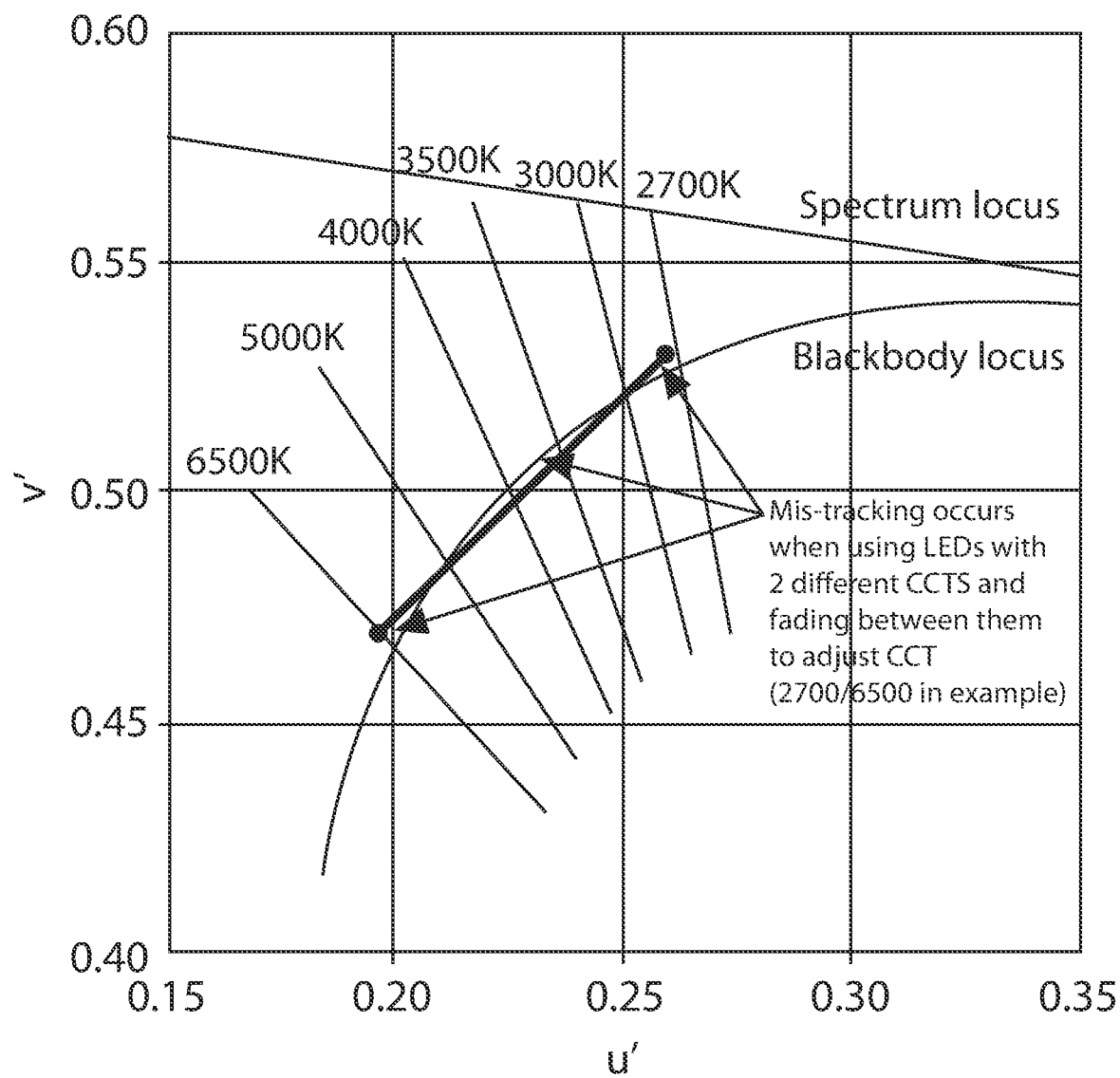
FIG. 5 is a chromaticity diagram illustrating a second example of light output from a conventional system having two LEDs against the blackbody locus of FIG. 3 and showing mistracking.
Figure 6:
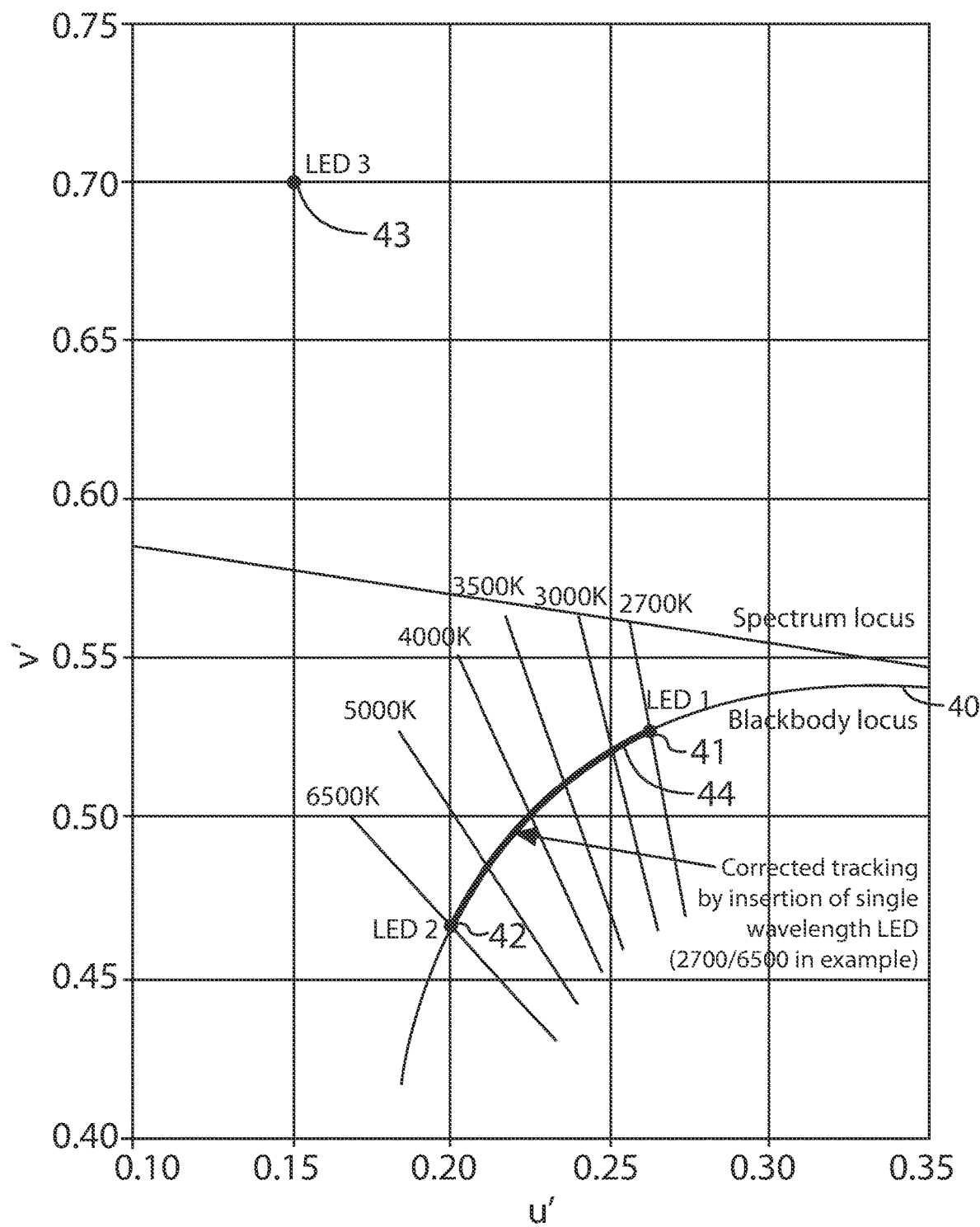
FIG. 6 is a chromaticity diagram showing example light output of a tunable lighting system according to principles of the invention.

FIG. 6 is a chromaticity diagram showing light output of a tunable LED lighting system according to one embodiment. Chromaticity diagrams are explained above in the background, and the diagram shown in FIG. 6 is the same as the diagram shown in FIG. 3 with the addition of a line 44 showing the light output of a tunable lighting system according to an embodiment of the present invention. In FIG. 6, a first LED has a spectral output located at the point 41 where the 2700 CCT line intersects the blackbody locus 40 and a second LED has a spectral output at the point 42 where the 6500 CCT line intersects the blackbody locus. A third LED has a spectral output located at a point 43 that is outside of the main area of the diagram. The first and second LEDs individually emit light that falls on the blackbody curve. The combination of the outputs of the first LED, the second LED, the third LED is a curved line that follows the blackbody locus 40. Accordingly, it can be seen that the combination of various relative strengths of light from the LEDs does achieve other CCTs and those CCTs do fall on the blackbody locus 40, unlike the conventional lighting systems described with respect to FIG. 5. The tunable light output is accomplished by the inclusion of a correction circuit including a third LED, also referred to as a correction LED according to embodiments of the invention in the tunable lighting system. The correction circuit operates to drive the tunable lighting system such that the light output follows the blackbody locus. This will be further explained below.

Figure 7:
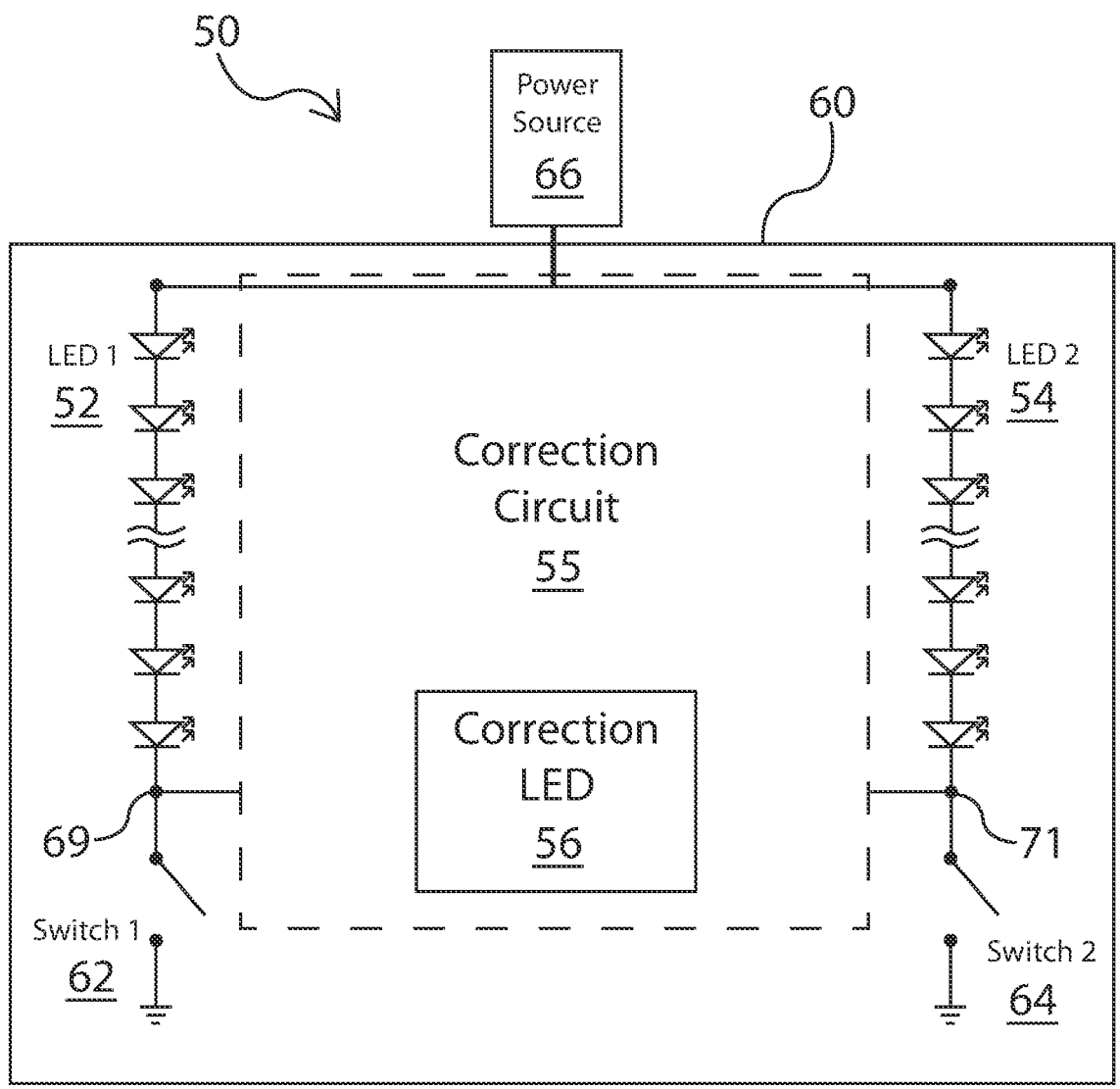
FIG. 7 is a diagram of a circuit for a tunable lighting system capable of producing the output shown in FIG. 6.

FIG. 7 is a schematic diagram of a circuit for a tunable lighting system 50 capable of producing the output shown in the chromaticity diagram of FIG. 6. The tunable lighting system 50 has tunable light circuitry 60 powered by a power source 66. The power source 66 may be a single power source or may be a plurality of power sources. The tunable light circuitry 60 includes a first LED 52 (also referred to as CCT1), a second LED 54 (also referred to as CCT2), and a color correction circuit 55. Color correction circuit 55 includes a correction LED 56. The first LED 52 is coupled to a first switch 62. The second LED 54 is connected to a second switch 64. First LED 52, second LED 54 and correction LED 56 may each be a combination of multiple LEDs that are connected in series, parallel or series and parallel combinations. The correction circuit 55 is integrated between first LED 52 and second LED 54. Correction circuit 55 is controlled by signals at first node 69 between the LED 52 and switch 62 on one side, and at a second node 71 on other side. PWM signals can be out of phase between the two nodes. First LED 52 and second LED 54 may be powered from separate current sources. Further, analog control of the correction circuit 55 is also possible.

In operation, the first LED 52 is driven by a first driver at junction point or first node 69, and second LED 54 is driven by a second driver at junction point or second node 71. The light output of the tunable lighting system 50 is the combined spectral outputs of the first LED 52, the second LED 54 and the correction LED 56. The color correction circuit 55 controls the correction LED 56 to emit light such that the combined output of all the LEDs in the system 50 follows a selected spectral characteristic, namely the blackbody locus 40 shown in FIG. 6. The blackbody locus is associated with sunlight or the light output of an incandescent lamp.

By adding a specific wavelength of light in the proper amount, the location of the blended resulting output can be moved in the directions of both of the axes on the C.I.E. color space chromaticity diagrams. The wavelength of the correction LED 56 determines the direction of the change and the relative intensity determines the amount of change. In the present embodiment, the correction LED 56 is, for example, a "green" LED with light output at approximately 520 nm wavelength. An LED having approximately this wavelength and operated by the correction circuit has the effect of maintaining the combined spectral outputs of the lighting system 50 on the blackbody locus. The output of the tunable lighting system can be operated to replicate a desired result such as white light as shown in FIG. 6. LEDs having other wavelengths are also possible. That is, other wavelengths within "green" are possible, but also other wavelengths in other colors such as cyan or yellow. Other desired spectral characteristics include specific color rendering lighting output and light output to meet circadian rhythm regulation requirements. The flexibility of configuration and accuracy of light output with regard to matching a selected spectral characteristic are particular advantages of embodiments of the present invention.

Figure 8A:
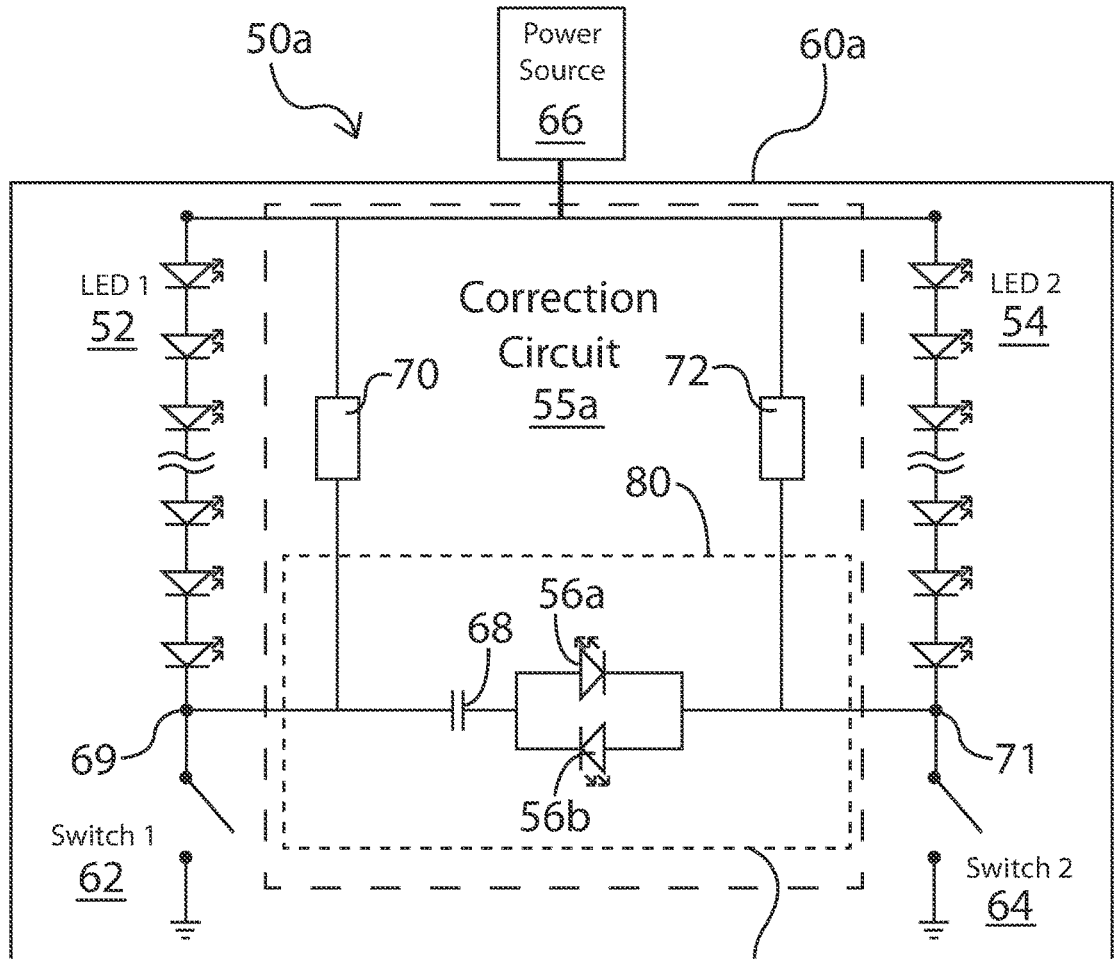
FIG. 8a is a diagram of the tunable lighting system of FIG. 7 including a first embodiment of a correction circuit according to principles of the invention.
Figures 8B, 8C:
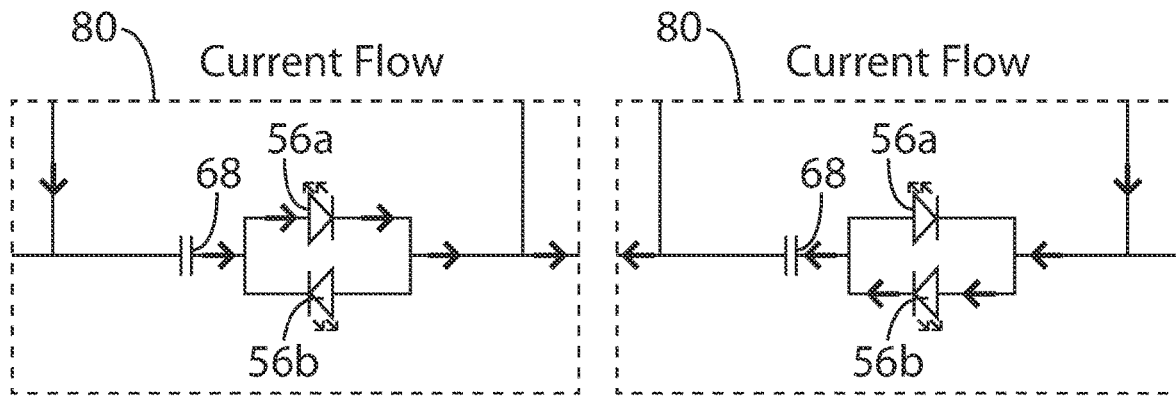
FIG. 8b is a diagram of a portion of the correction circuit of the tunable lighting system of FIG. 8a showing current flow.
FIG. 8c is a diagram of a portion of the correction circuit of the tunable lighting system of FIG. 8a showing current flow.

FIG. 8a is a diagram of an embodiment of the tunable lighting system and FIGS. 8b and 8c are diagrams of portions of the tunable light system of FIG. 8a showing current flow. In FIG. 8a, the tunable lighting system 50a has a tunable light circuit 60a and a power source 66. The tunable light system 50a includes a first LED 52, a second LED 54, and a color correction circuit 55a. The first LED 52 is coupled to a first switch 62. The second LED 54 is coupled to a second switch 64.

The correction circuit 55a includes a correction capacitor 68 and one or more correction LEDs, shown simply as a first correction LED 56a and second correction LED 56b. The correction circuit 55a further includes a first charge restorative device 70 and a second charge restorative device 72. It is understood that first correction LED 56a and second correction LED 56b may each be a plurality of LEDs. First and second LEDs are connected in parallel and then together in series with correction capacitor 68. The charge restorative devices 70, 72 may be resistors or current sources.

A positive pulse causes current to flow through each correction LED 56a and 56b until correction capacitor 68 is charged. FIGS. 8b and 8c are diagrams of a portion 80 of the correction circuit 55a having the correction LED and including arrows showing current flow. The correction circuit portion 80 has a capacitor 68 connected in series with LEDs 56a and 56b that are connected in parallel. One or both diodes may be a light emitting diode (LED). Correction capacitor 68 can be discharged with zero voltage or negative pulse through the diodes. The result is light being emitted from correction LED 56 for a short time when each switch 62, 64 closes and sends a pulse, the generated corrective light output being mixed with the light outputs from first LED 52 and second LED 54 to provide corrected light. The charge restorative devices (resistors or current sources), respectively 70 and 72, shown in the correction circuit can be of differing values such that the correction can be made to favor first LED 52 or second LED 54 in order to meet the selected spectral characteristic. The charge restorative devices 70, 72 can be replaced with a constant current that will smooth the amount of current delivered to the correction LED(s).

FIG. 9a is a diagram of an alternative embodiment of the tunable lighting system and FIGS. 9b and 9c are diagrams of portions of the tunable light system of FIG. 9a showing current flow. In FIG. 9a, the tunable lighting system 50b has a color correction circuit 60b and power source 66. The tunable lighting system 50b further includes a first LED 52 and a second LED 54. The correction circuit 60b includes a correction capacitor 68, a bridge rectifier 67 and correction LED 56 at the center of the bridge 67. A positive or negative pulse causes current to flow through correction LED 56 until correction capacitor 68 is charged as shown in circuit portion 82, FIGS. 9b and 9c, where the arrows showing current flow. Alternative plus and minus pulses maintain the light output of correction LED 56. The result is corrective light being emitted from correction LED 56. This corrective light is mixed with the light outputs from first LED 52 and second LED 54 to provide corrected light. Charge restorative devices, respectively 70 and 72, shown in the correction circuit can be of differing values such that the correction can be made to favor the first LED 52 or the second LED 54. These charge restorative devices can be replaced with a constant current that will smooth the amount of current delivered to the correction LED(s).

Figure 10:
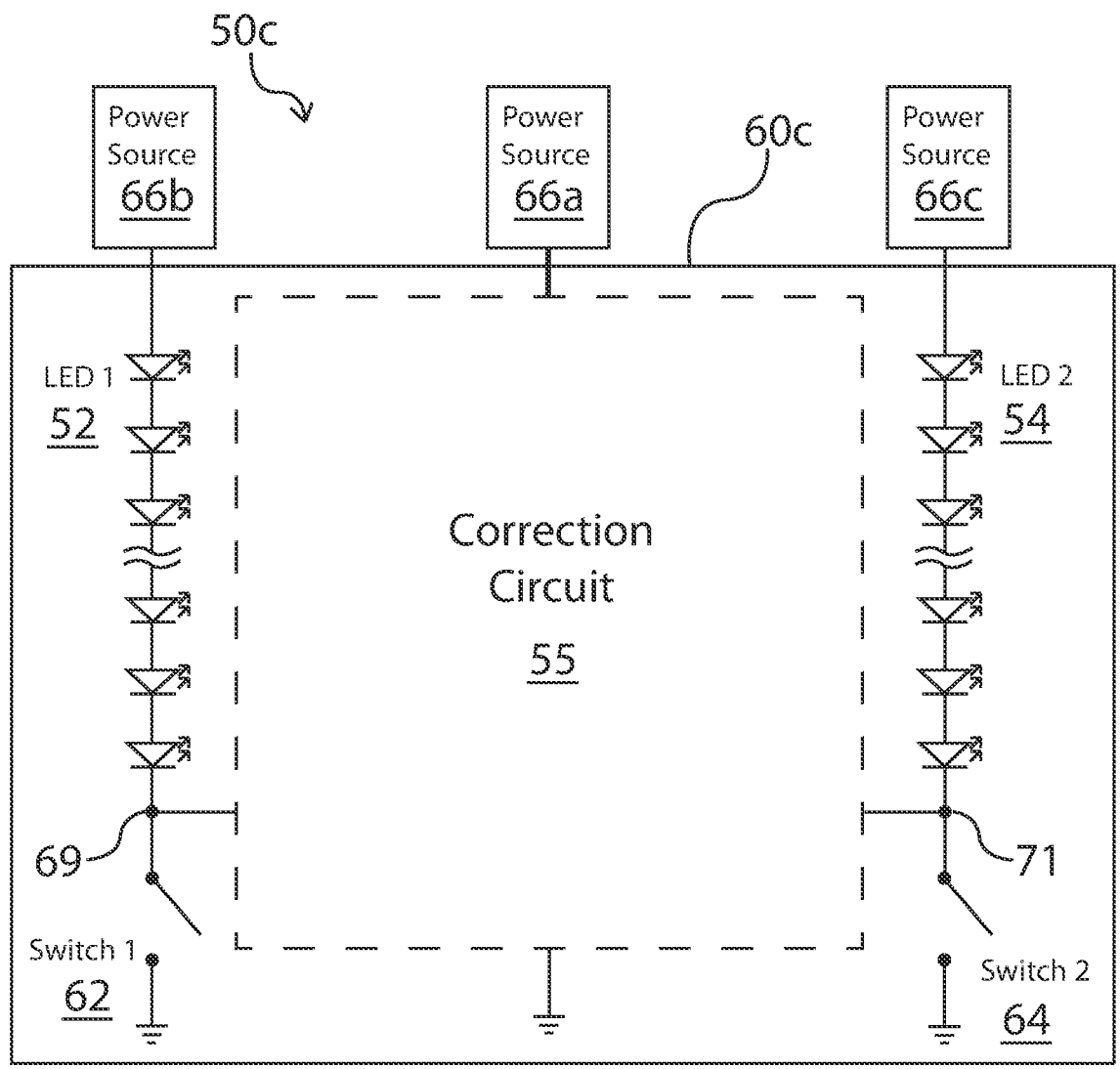
FIG. 10 is a diagram of the circuit for an alternative embodiment of a tunable lighting system capable of producing the output shown in FIG. 6, the tunable lighting system having multiple power sources.

FIG. 10 is a diagram of a further alternative embodiment of the tunable lighting system. In FIG. 10, correction circuit 55 is integrated between first LED 52 and second LED 54. The tunable lighting system 50c is powered by multiple power sources 66 (66a, 66b, 66c). Correction circuit 55 is controlled by signals at first node 69 between the LED 52 and switch 62 on one side and at second node 71 between the LED 54 and switch 64 on other side. PWM signals can be out of phase between the two nodes. First LED 52 and second LED 54 may be powered from separate current sources 66b, 66c.

Figure 11:
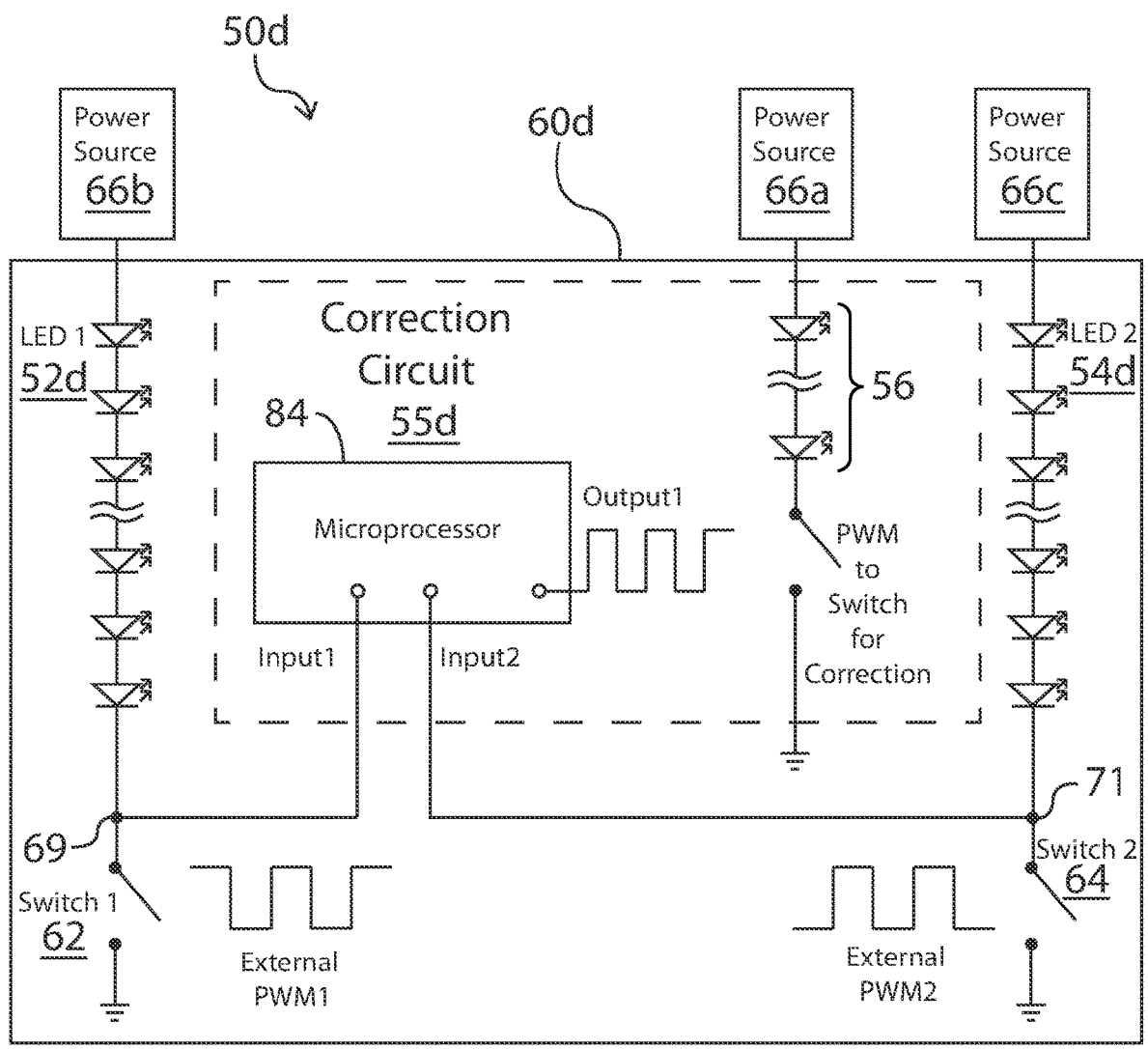
FIG. 11 is a further alternative embodiment of the tunable lighting system according to principles of the invention.

FIG. 11 is a diagram of a further alternative embodiment of the tunable lighting system. The tunable lighting system 50d has a first plurality of LEDs 52d and a second plurality of LEDs 54d and correction circuit 55d. The first plurality of LEDs 52d is connected to switch 62d and the second plurality of LEDs 54d is connected to switch 64d. The correction circuit 55d includes a microprocessor 84 providing signals to correction LEDs 56d.

Figure 12:
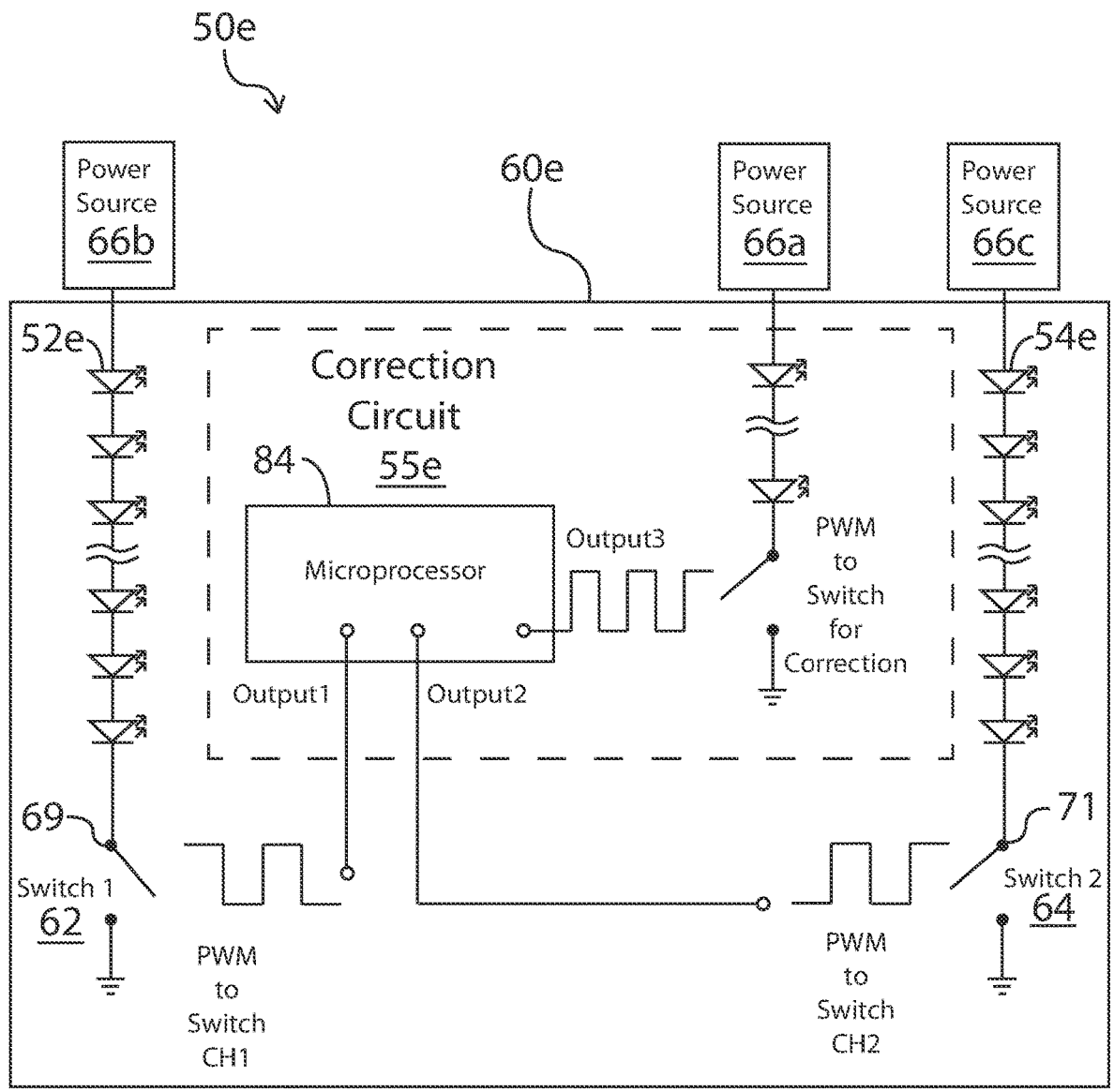
FIG. 12 is a still further alternative embodiment of the tunable lighting system according to principles of the invention.

FIG. 12 is a diagram of another alternative embodiment of the tunable lighting system. The tunable lighting system 50e had a first plurality of LEDs 52e and a second plurality of LEDs 54e and a correction circuit 55e. The first plurality of LEDs 52e has a first power source 66b; the second plurality of LEDs 54c has a second power source 66c. Correction circuit 55d includes correction LEDs 54c controlled by a microprocessor 84 which is driven by its own power source 66a.

Figure 13:
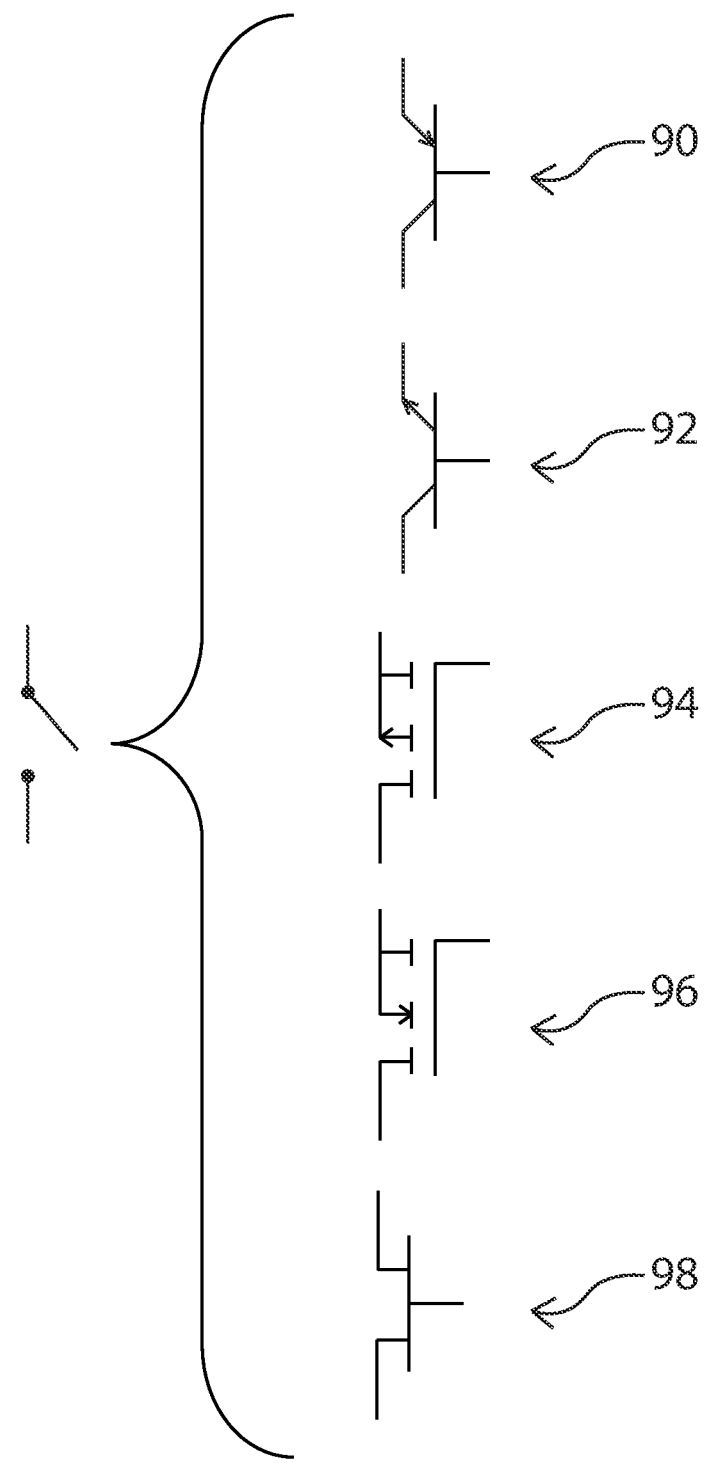
FIG. 13 is a diagram of various switching types that can be used for the switches shown in FIGS. 7-12.

FIG. 13 is a diagram of switch types suitable for use in the tunable lighting systems described above. The alternative switch types that may be used in various embodiments of the tunable lighting systems for switches 62, 64 include a PNP transistor 90, an NPN transistor 92, a p-type metal oxide semiconductor field transistor (MOSFET) 94, an n-type MOSFET 96, and a junction gate field-effect transistor (JFET) 98. It should be understood that the present invention is not limited by these example switch types.

Figure 14:
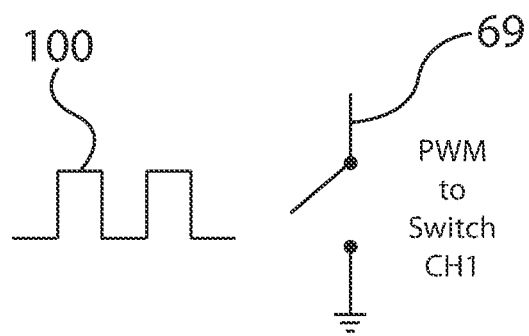
FIG. 14 illustrates pulse width modulator (PWM) differential phase shifts between the pulses being sent to the circuits in FIGS. 7-12.
Figure 14:
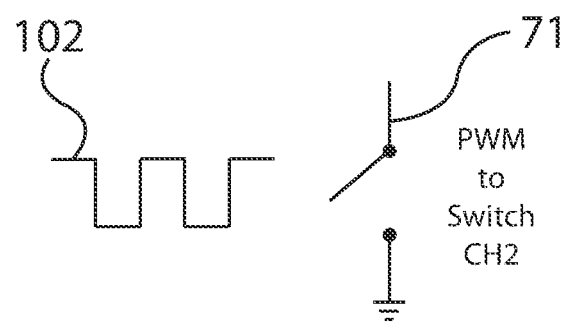

FIG. 14 is a diagram showing out of phase PWM signals 100, 102. For any of the various embodiments of the tunable lighting systems described above, PWM signals can be out of phase between the two nodes 69 and 71.

In alternative arrangements of the above-described correction circuits, assuming two channels are fed with alternating PWM, the third correction channel receives power proportional to the alignment of the duty cycles (that is, maximum power at 50/50%, minimum at 0/100%). By unbalancing the charge restorative devices, it is possible to bias the correction to one side more than the other, i.e., move the peak of correction towards the first LED or the second LED. By using constant current devices in place of the charge restorative devices there is a constant current delivered to the correction LED until the capacitor fully charges/discharges (equalizes).

In an alternative embodiment, maintaining the PWM ratio but increasing/decreasing the PWM frequency allows adjustment of the correction power without affecting the brightness of the LED CCT1 and CCT2 strings.

In an alternative embodiment, using an inverter to control CCT2 inverse of CCT1, one square wave input can be used to control the amount of CCT1 relative to CCT2.

In an alternative embodiment, varying the current from the overall power source allows both CCTs to be dimmed together (reducing the overall intensity), while the correction LED intensity follow proportionally. This allows a conventional single channel dimming LED power source to be compatible with the tunable LED system.

In an alternative embodiment, using a power square wave instead of a switch eliminates the need for the pull-up charge restoration devices and can increase the efficiency of the system.

In an alternative embodiment, inserting a constant current device in series with the correction LED(s) also provides a controlled flat amount of current.

In an alternative embodiment, multiple correction circuits can be employed with separate curve biases by using a diode from the bottom of the LED string to the capacitor/charge restorative device.

In an alternative embodiment, a sensor can determine the delta u' v' error (Duv error) (difference from the blackbody curve) by measuring the blended output of the two CCT LEDs and can be used to add correction in real time. This can be independent or combined with circuits shown.

For the corrective circuits described above, the Color Rendering Index shows an improvement due to the correction LED as well.

Figure 15:
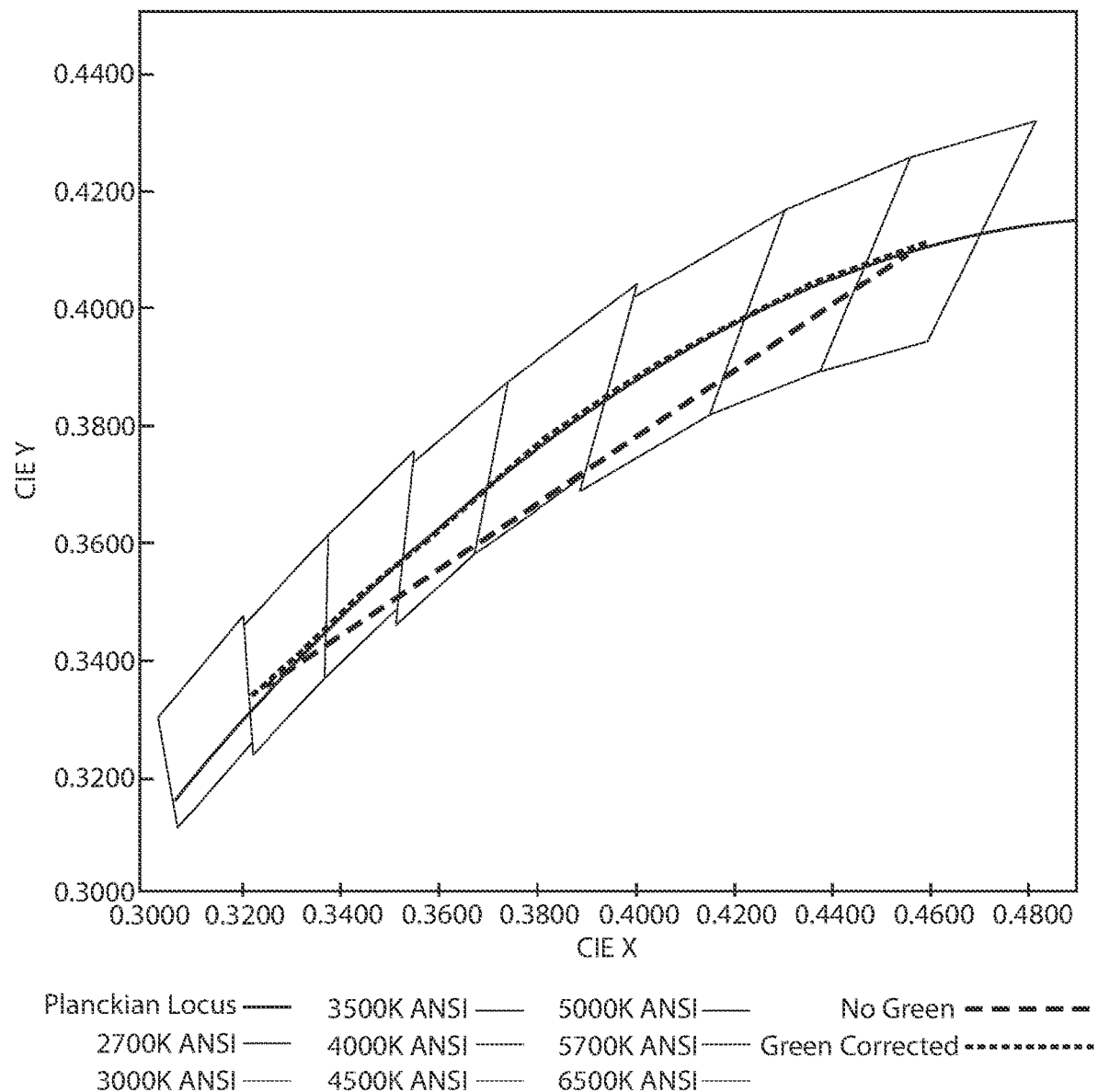
FIG. 15 is a plot of test data for the lighting system depicted in one embodiment of the invention.

FIG. 15 is a graph of test data for a system that uses two LED's of different CCT's and corresponding data for the same two LED systems using the error correction circuit shown in an embodiment. In this set of test data, the LED in the correction circuit is a green LED as described above with regard to FIGS. 6 and 7.

FIG. 16 shows tables of test data comparing various optical parameters as measured without correction and with correction. This data is the basis for the plots in FIG. 15. The correction circuit with the correction LED demonstrably brings the overall light output of the tunable lighting system to the desired output curve.

Figure 17A:
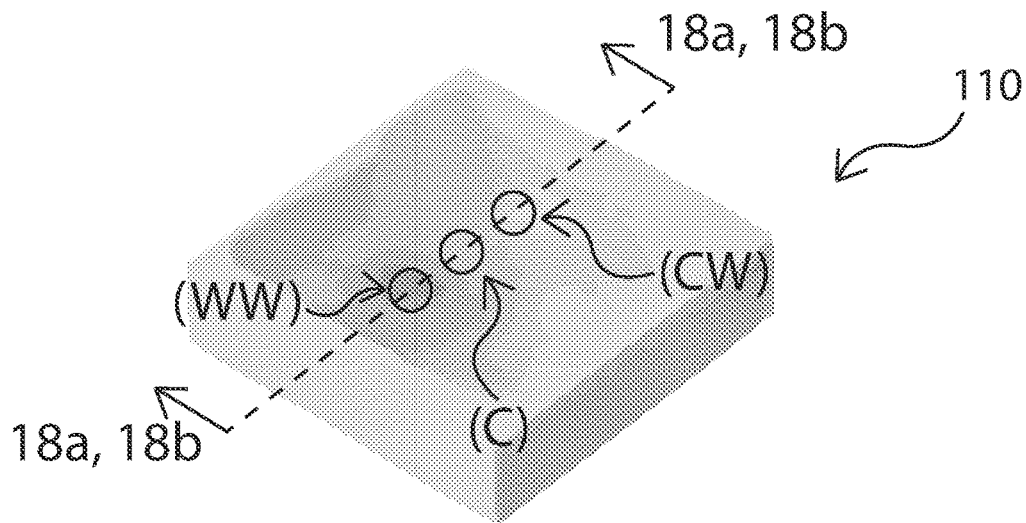
FIG. 17a is one embodiment of a package for the tunable lighting system.
Figure 17B:
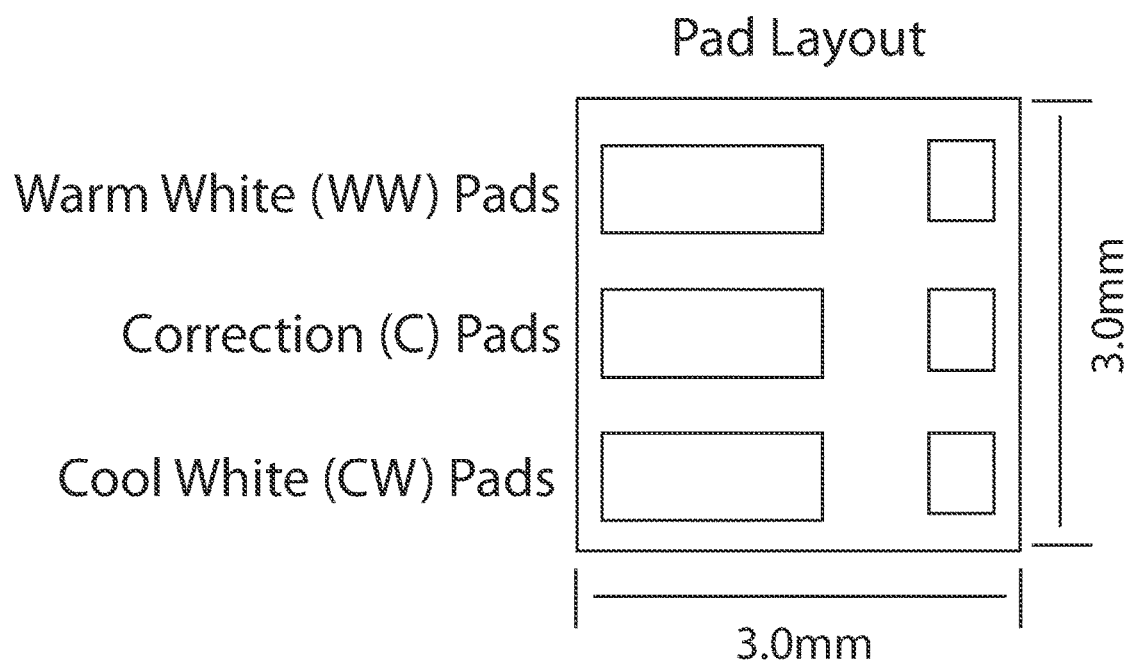

FIG. 17*a* shows an exemplary package 110 suitable for use in embodiments of the tunable lighting system 50. Package 110 is a six-lead package. The connection pads on the backside of package 110 are schematically illustrated in FIG. 17*b*. Correction LED 56 is for example green, however, other colors are possible. Mono-directional green correction allows high color quality which is beneficial for use during long period of night time electric lighting use in extreme northern and southern latitudes during winter months.

Figure 18A:
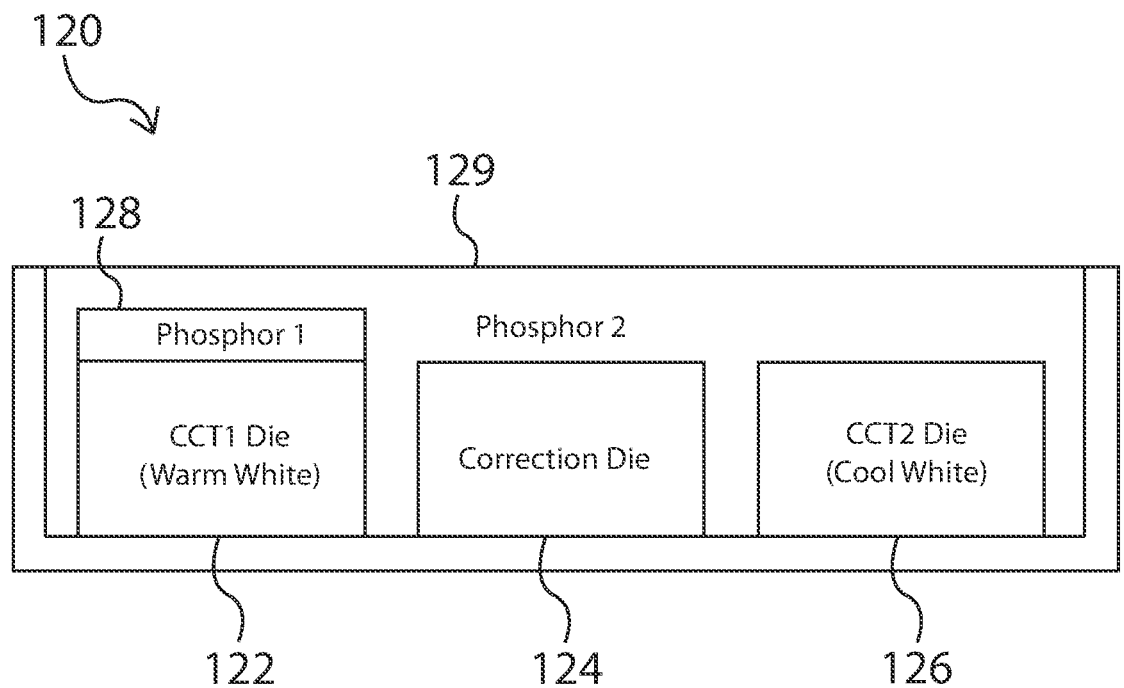
Figure 18B:
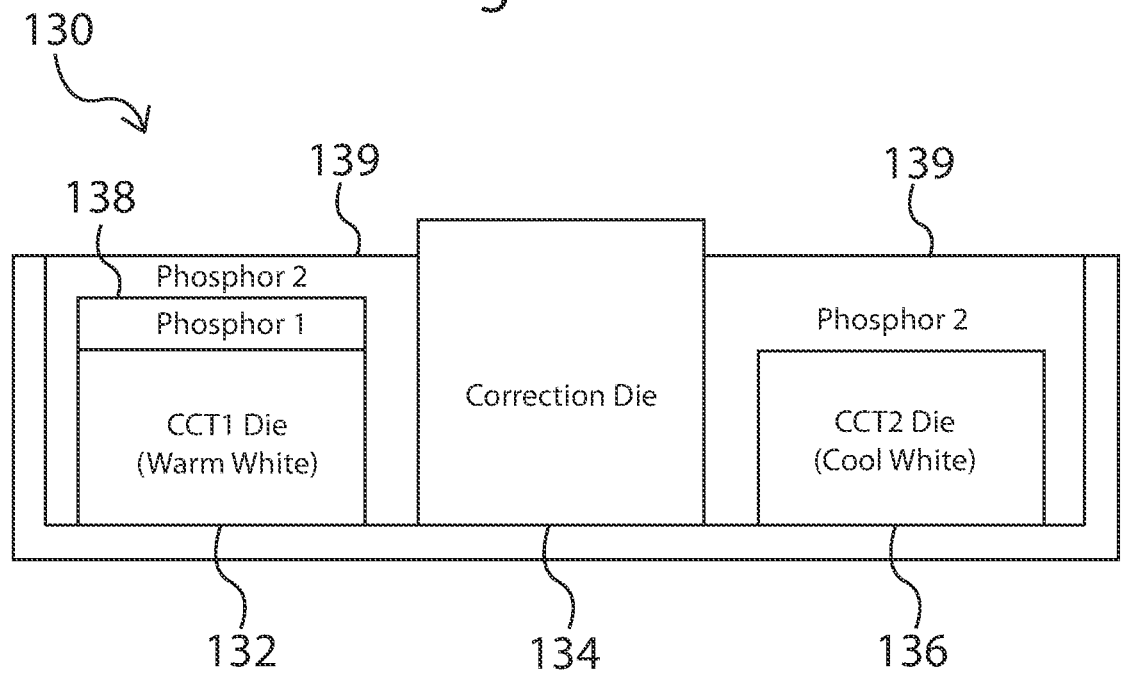

FIG. 18*a* illustrates one embodiment for fabricating a package such as the one shown in FIG. 17*a*. The package 120 has a warm white LED 122, a cool white LED 126 and a correction LED 124 with a layer of phosphor 129 (phosphor 2). Warm white and cool white refer to the same color but different color temperatures as described above in the background. An extra layer of phosphor 128 (phosphor 1) may be added to one of the die, for example the warm white LED 122, to change its color temperature. FIG. 18*b* illustrates another embodiment for fabricating the package shown in FIG. 17*a*, where the correction die's surface extends beyond the phosphors. In FIG. 18*b*, the package 130 includes a warm white LED 132, a cool white LED 136 and a correction LED 134. The warm white LED 132 has a layer of phosphor 1 (138) and a layer of phosphor 2 (139) while the cool white LED 136 has only a layer of phosphor 2 (139). The correction LED 134 extends beyond the layer of phosphor 2.

Figure 19:
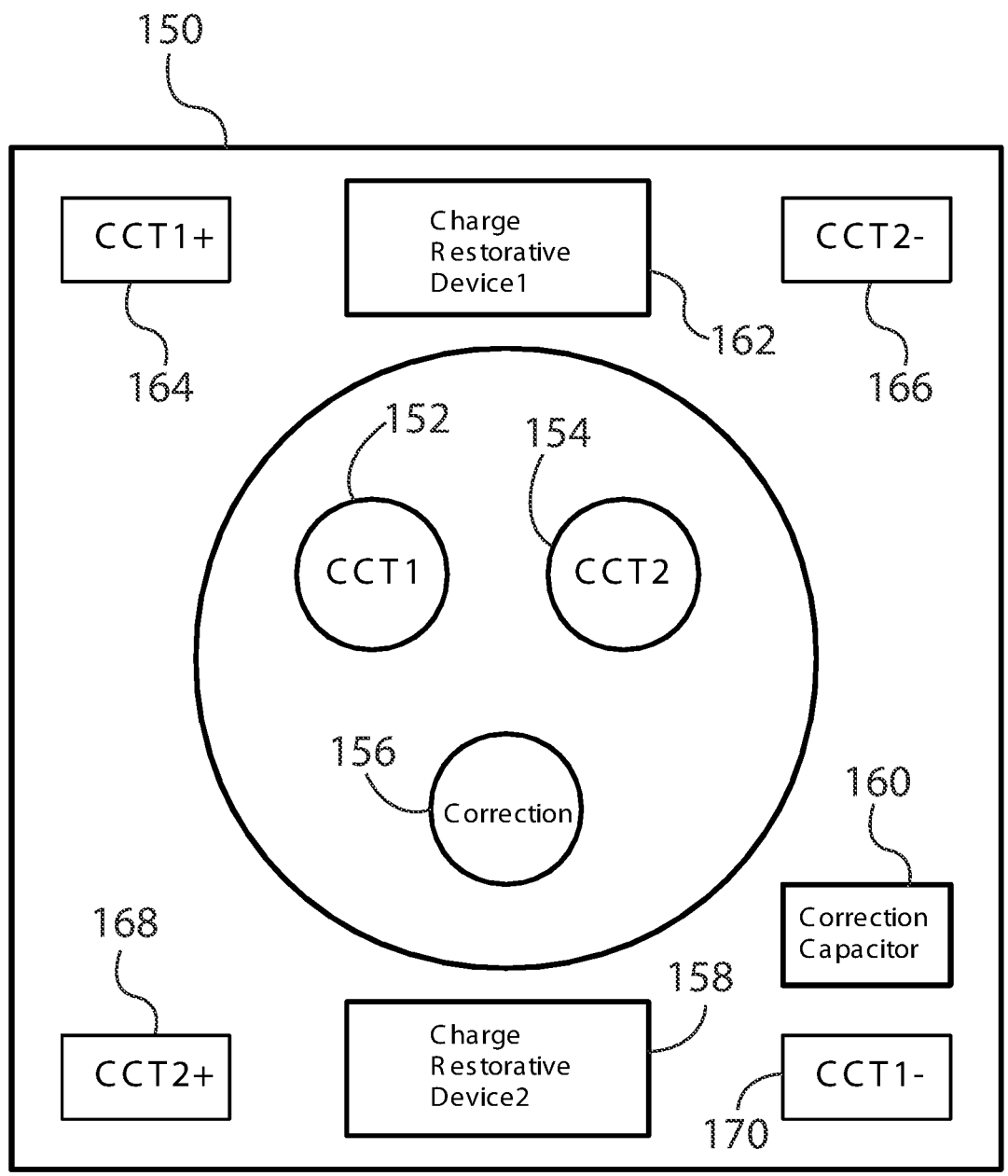
FIG. 19 is one embodiment of a Chip-on-Board package for the tunable lighting system.

FIG. 19 illustrates a COB (chip-on-board) array 150 containing the two different CCT LEDs 152, 154 with the correction circuit on board having a correction LED 156.

Figure 20:
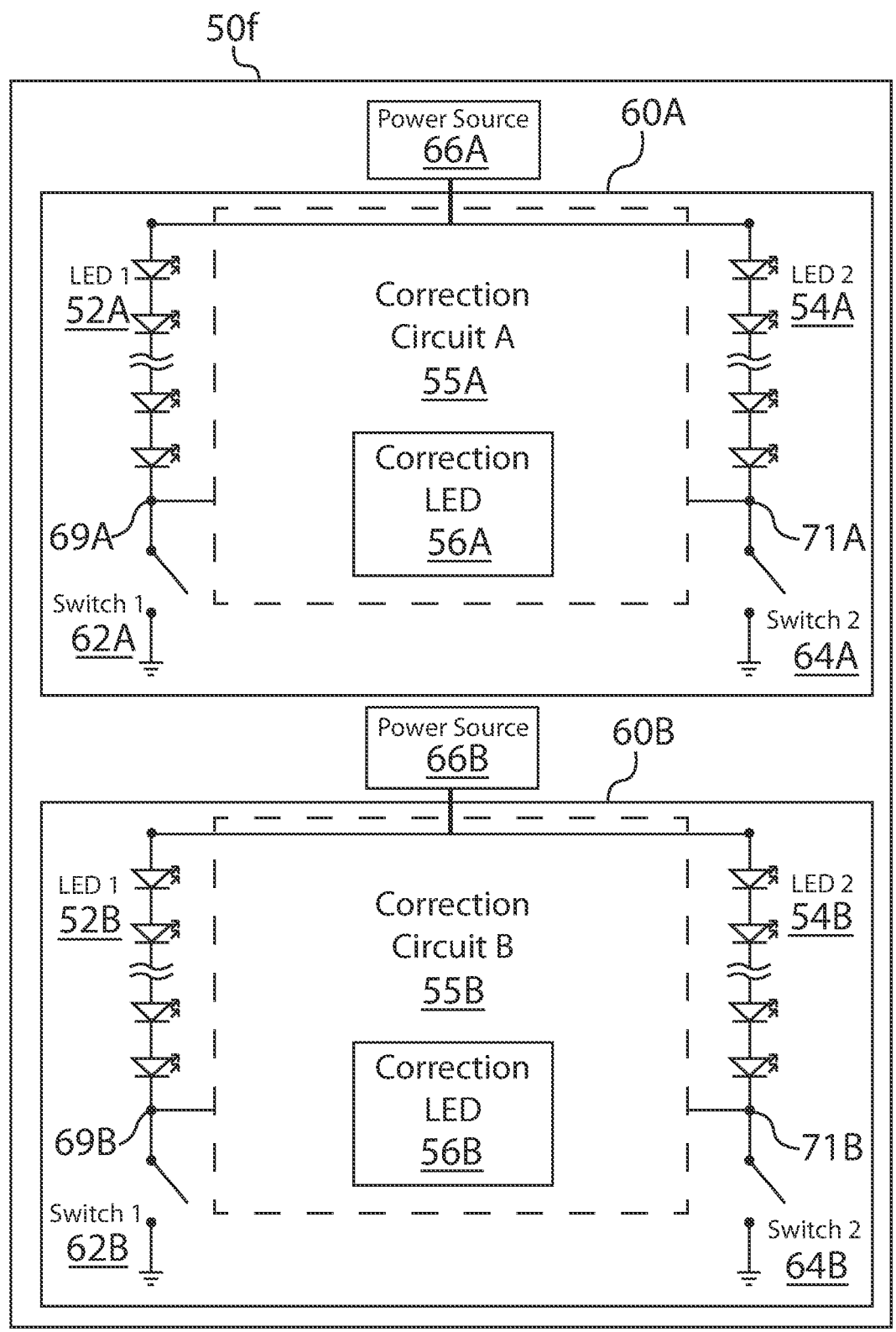
FIG. 20 is a tunable lighting system having a plurality of tunable lighting circuits according to principles of the invention.

FIG. 20 shows an embodiment of a tunable lighting system 50*f* having a plurality of tunable circuits. The tunable lighting system 50*f* has a first tunable light circuit 60A capable of providing a first quality of light output. The tunable lighting system 50*f* has a second tunable circuit 60B capable of providing a second quality of light output. Accordingly, the tunable lighting system 50*f* is able to provide more than one quality of light output. In alternative embodiments, the tunable lighting system may include more than two tunable circuits.

In an alternative embodiment, the color correction circuit is included in the LED module in the flash unit of a digital camera. The digital camera is part of a smart phone in a first arrangement. In alternative arrangements, the digital camera is part of a tablet computer, smart glasses or a smart watch. The color correction circuit interfaces in these devices with the device's GPS unit and clock. If the device includes a manual override, the user may have the option of tuning the flash for photographic effects.

In another alternative embodiment, the color correction circuit is included in a flashlight for corrected light or in green only for optimal eye sensitivity in a dim light setting. If the flashlight is included in a smart phone, the smart phone calculates a best light for the setting and may be adjusted based on smart phone battery life. In this embodiment, the user typically makes this adjustment to avoid running out of light in situations where the flashlight is needed.

Similarly, the camera flash can be adjusted to the exact lighting conditions based on location and time.

In another alternative embodiment, the color correction circuit is included in an LED module that further includes CW, WW, green, red and blue LEDs. Each of the LEDs is controlled independently. The assembly can be used as an optical flash. For example, the assembly could be activated to flash red and blue as an emergency signal. The assembly could also be used to flash colors in accompaniment to music at a concert or a party.

In another alternative embodiment, the color correction circuit is included in the circuits that drive a smart phone screen. In a preferred arrangement, the screen color is corrected in daylight and then adjusted for color to avoid sleep interference at night. The phone further includes programming that takes as input the distance of the phone from the user's face and calculates the correlated color temperature to match the perception of white. Alternatively, device screens can be more user friendly if the existing backlight source is able to be tuned to time of day or do accommodate changing light conditions (i.e., bright, sunlight, cloudy, rain). In the case of a device with a photocell/camera, the light can be adjusted based on photocell or camera input.

In any of the above alternative embodiments, the color correction circuitry in the flash module and in the screen are able to use various sensors typically present in a smart device in order to make adjustments or improvements to videos, photos or screen images. One sensor option is using the camera as a photocell. Information from the photocell may be used to adjust the flash module or the screen.

In one embodiment where color correlated temperature correction is being used, tunable lighting system 50d (shown in FIG. 11) comprises at least one LED and a controlled power source to drive the LED to provide light that matches certain circadian rhythm characteristics for a specified location. One method of matching the circadian rhythm characteristics is to match the light to the normal sunlight of the day for that location (a sun simulator) and the other is to have specific blasts of light for short periods of time in the morning and evening. The associated driver circuitry may use no microprocessor, but may have factory setting of the global position and timing or on site setting. The correction circuit, in further alternative embodiments, may interface with the clock and positioning systems in the larger electronic device in which it is installed (e.g., a smart phone, tablet, etc.) Corrected light can be used to simulate sunlight for health benefits as well as creating an awareness of time in inside spaces that don't have access to external light. The correction LED can be driven by an individual channel, or the PWM of the drive for the two CCT LED strings can be modified to allow phantom control of the correction by varying the frequency of the PWM signal.

The tunable lighting system described herein has advantages in devices that have a GPS system and a clock. The tuning of light results in better light for humans interacting with the light emitted from the devices. The benefits of tuning and adjusting light in real time while traveling can ameliorate the effects of jet lag and sleep deprivation. Topics of healthy lighting include CCT control, color quality and glare reduction as well as matching the changing of these characteristics throughout the day of sunlight. Beneficial night time lighting is that which most closely resembles a fire if kept on for long periods of time. Circadian stimulus is important for understanding healthy lighting.

While several embodiments of the invention, together with modifications thereof, have been described in detail herein and illustrated in the accompanying drawings, it will be evident that various further modifications are possible without departing from the scope of the invention. The scope of the claims should not be limited by the preferred embodiments set forth in the examples, but should be given the broadest interpretation consistent with the description as a whole.

It is to be understood that the above-identified embodiments are simply illustrative of the principles of the invention. Various and other modifications and changes may be made by those skilled in the art which will embody the principles of the invention and fall within the spirit and scope thereof.

We claim:

1. A tunable lighting system, comprising:
    a first white LED having a first spectral output on a blackbody curve;
    a second white LED having a second spectral output on the blackbody curve; and,
    a correction circuit including a correction LED configured to output light having a wavelength in green, cyan or yellow, the correction circuit to control the correction LED to emit light that, when combined with light emitted from the first white LED and light emitted from the second white LED, produces light that follows the blackbody curve.

2. The tunable lighting system of claim 1, wherein the correction circuit further comprises:
    a capacitor; and
    two correction diodes connected in parallel and oppositely biased and where the capacitor is connected in series with the two correction diodes.

3. The tunable lighting system of claim 2 wherein a first correction diodes of the two correction diodes is an LED.

4. The tunable lighting system of claim 2 wherein the two correction diodes are LEDs.

5. The tunable lighting system of claim 2 wherein the correction circuit further comprises a first charge restorative device and a second charge restorative device wherein the first charge restorative device and second charge restorative device are selected to bias the correction circuit to the first white LED over the second white LED.

6. The tunable lighting system of claim 1 wherein the correction circuit further comprises a capacitor connected in series with a bridge rectifier, the bridge rectifier having a center diode and where the correction LED is the center diode.

7. The tunable lighting system of claim 1 wherein the correction circuit further comprises a microprocessor to control the correction LED.

8. The tunable lighting system of claim 1 further comprising:
    a third white LED having a third spectral output at a third locus on the blackbody curve;
    a fourth white LED having a fourth spectral output at a fourth locus on the blackbody curve; and
    a second correction circuit, the third white LED, fourth white LED and second correction circuit configured to enable the tunable lighting system to produce light having a selected spectral characteristic.

9. The tunable lighting system of claim 1 wherein the first white LED is a cool white LED, the second white LED is a warm white LED, and the correction LED is a green LED.

10. The tunable lighting system of claim 1 wherein the tunable lighting system produces light according to a circadian rhythm.

11. A method of operating a tunable lighting system wherein the lighting system comprises a first white LED having a first spectral output on a blackbody curve, a second white LED having a second spectral output on the blackbody curve, and a correction circuit including a correction LED configured to output light having a wavelength in green, cyan or yellow, the method comprising:
    generating signals in the correction circuit to control the non-white correction LED to emit light that, when combined with light output from the first white LED and light output from the second white LED, produces light that follows the blackbody curve.

\* \* \* \* \*